US012645829B2

(12) United States Patent
Shao et al.

(10) Patent No.: US 12,645,829 B2
(45) Date of Patent: Jun. 2, 2026

(54) USER DATA PROCESSING SYSTEM, METHOD, AND APPARATUS

(71) Applicant: HUAWEI TECHNOLOGIES CO., LTD., Guangdong (CN)

(72) Inventors: Yunfeng Shao, Beijing (CN); Bingshuai Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 13 days.

(21) Appl. No.: 18/764,330

(22) Filed: Jul. 4, 2024

(65) Prior Publication Data

US 2024/0362361 A1 Oct. 31, 2024

Related U.S. Application Data

(63) Continuation of application No. PCT/CN2022/105396, filed on Jul. 13, 2022.

(30) Foreign Application Priority Data

Jan. 10, 2022 (CN) .......................... 202210023462.X

(51) Int. Cl.
*G06F 21/62* (2013.01)
*H04L 9/08* (2006.01)
(52) U.S. Cl.
CPC ........ *G06F 21/6245* (2013.01); *H04L 9/0816* (2013.01)
(58) Field of Classification Search
CPC ..... G06F 21/6245; G06F 21/60; G06N 3/098; G06N 3/045
See application file for complete search history.

(56) References Cited

U.S. PATENT DOCUMENTS

| | | | | |
|---|---|---|---|---|
| 10,977,711 B1 * | 4/2021 | Verma | ................... | G06F 18/231 |
| 2020/0082259 A1 * | 3/2020 | Gu | ........................... | G06N 3/08 |
| 2024/0070469 A1 * | 2/2024 | Tsuchida | ............. | G06F 21/6218 |

FOREIGN PATENT DOCUMENTS

CN 110572253 A 12/2019

OTHER PUBLICATIONS

Hangyu Zhu et al., "PIVODL:Privacy-preserving vertical federated learning over distributed labels", arxiv:2108.11444v1,Aug. 25, 2021,XP91038919, total 13 pages.

* cited by examiner

*Primary Examiner* — Thaddeus J Plecha

(57) ABSTRACT

This disclosure provides a user data processing system. A first data processing device in the system generates a first intermediate result, and sends a third intermediate result to a second data processing device. The third intermediate result is obtained from the first intermediate result based on a parameter of a first machine learning model and target historical user data obtained by the first data processing device, and an identifier of the target historical user data is the same as an identifier of historical user data of the second data processing device. The first data processing device further receives a second intermediate result, and updates the parameter of the first machine learning model based on the first intermediate result and the second intermediate result. The second data processing device further updates a parameter of a second machine learning model based on the received third intermediate result and the second intermediate result.

19 Claims, 14 Drawing Sheets

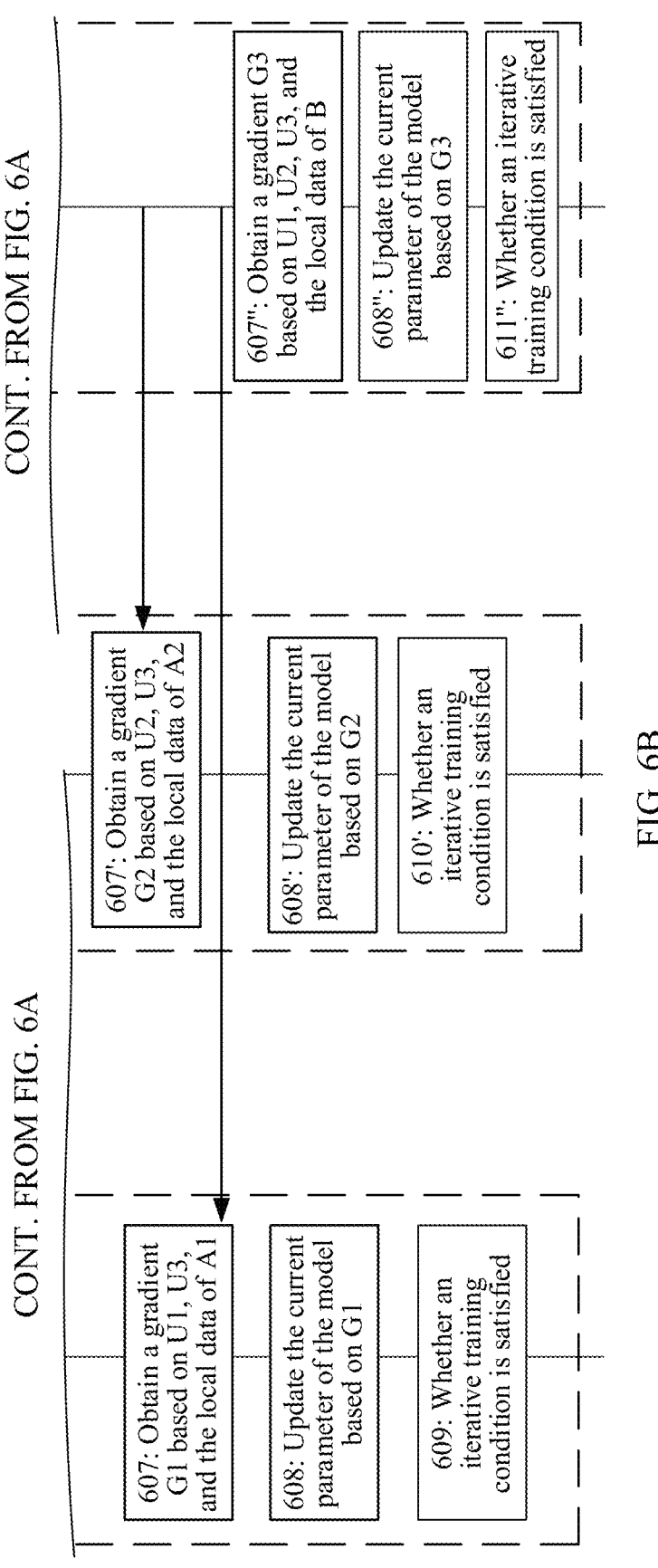

CONT. FROM FIG. 6A

607'': Obtain a gradient G3 based on U1, U2, U3, and the local data of B

608'': Update the current parameter of the model based on G3

611'': Whether an iterative training condition is satisfied

607': Obtain a gradient G2 based on U2, U3, and the local data of A2

608': Update the current parameter of the model based on G2

610': Whether an iterative training condition is satisfied

CONT. FROM FIG. 6A

607: Obtain a gradient G1 based on U1, U3, and the local data of A1

608: Update the current parameter of the model based on G1

609: Whether an iterative training condition is satisfied

FIG. 6B

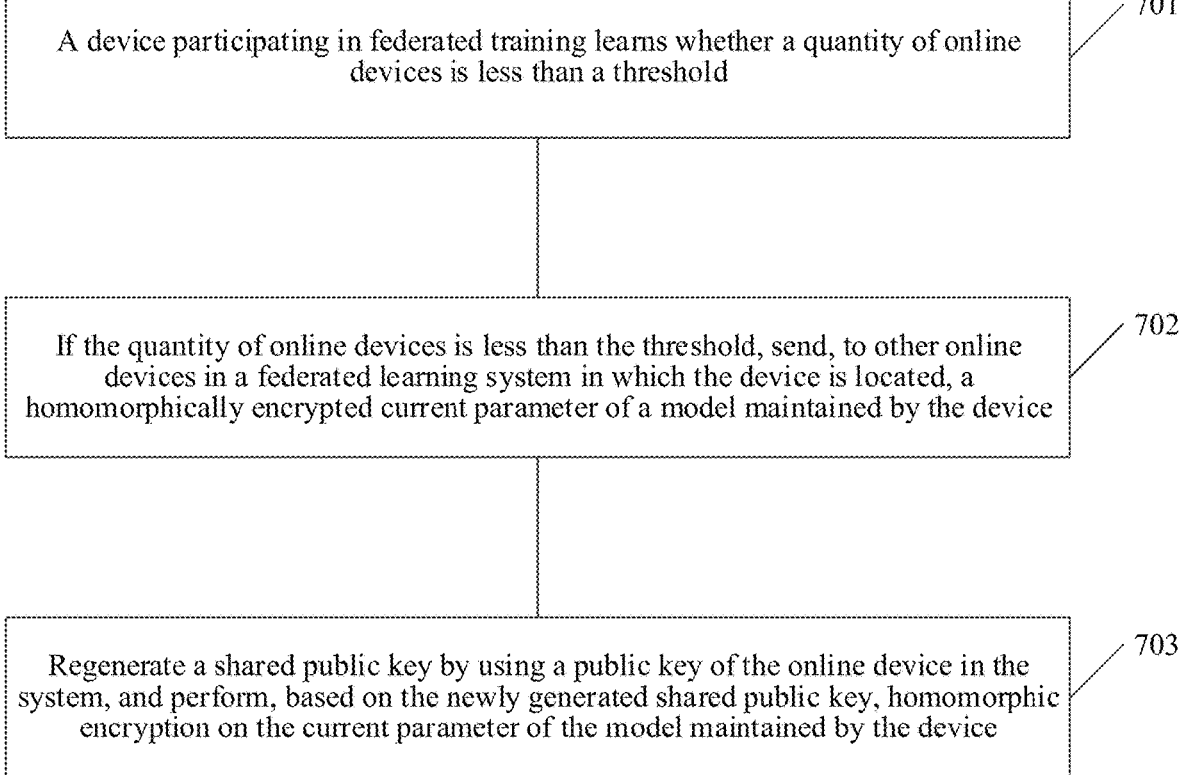

A device participating in federated training learns whether a quantity of online devices is less than a threshold ⟋ 701

If the quantity of online devices is less than the threshold, send, to other online devices in a federated learning system in which the device is located, a homomorphically encrypted current parameter of a model maintained by the device ⟋ 702

Regenerate a shared public key by using a public key of the online device in the system, and perform, based on the newly generated shared public key, homomorphic encryption on the current parameter of the model maintained by the device ⟋ 703

FIG. 7

USER DATA PROCESSING SYSTEM, METHOD, AND APPARATUS

CROSS-REFERENCE TO RELATED APPLICATIONS

This application is a continuation of International Patent Application No. PCT/CN2022/105396, filed on Jul. 13, 2022, which claims priority to Chinese Patent Application No. 202210023462.X, filed on Jan. 10, 2022. The disclosures of the aforementioned applications are hereby incorporated by reference in their entireties.

TECHNICAL FIELD

This application relates to the field of artificial intelligence technologies, and in particular, to a user data processing system, method, and apparatus in machine learning model training.

BACKGROUND

Federated learning is a distributed machine learning technology. Federated learning clients (FLCs) such as federated learning apparatuses 1, 2, 3, . . . , and k perform model training by using local computing resources and local network service data, and send model parameter update information $\Delta\omega$ generated in a local training process, for example, $\Delta\omega1$, $\Delta\omega2$, $\Delta\omega3$, . . . , and $\Delta\omega k$, to a federated learning server (FLS). The federated learning server aggregates, according to an aggregation algorithm, models based on Aw, to obtain an aggregated machine learning model. The aggregated machine learning model is used as an initialized model on which the federated learning apparatuses are to perform model training next time. The federated learning apparatuses and the federated learning server perform the foregoing model training process for a plurality of times, and do not stop training until an obtained aggregated machine learning model satisfies a preset condition.

Federated learning can fully utilize data and computing capabilities of the clients, enabling a plurality of parties to collaboratively establish a common and more robust machine learning model without sharing data. In an increasingly strict data supervision environment, federated learning can resolve key issues such as data ownership, data privacy, and data access permission, and has a great commercial value.

There is a need to expand applications of federated learning and to improve performance of machine learning models.

SUMMARY

In view of this, a system, a method, and an apparatus are provided, so that data in same feature space and different sample space and data in different feature space and same sample space can be simultaneously used as training samples to train a machine learning model, and application scenarios of federated learning can be expanded, making a prediction result of a trained machine learning model more accurate.

According to a first aspect, an embodiment of this disclosure provides a user data processing system. The system includes a first data processing device and a second data processing device. The first data processing device is configured to generate a first intermediate result, where the first intermediate result is obtained based on a parameter of a first machine learning model and historical user data that is obtained by the first data processing device. The first data processing device may obtain the historical user data in a plurality of manners. For example, the historical user data may be generated by the first data processing device, or the historical user data may be stored by the first data processing device. The first intermediate result may be obtained based on a product of the parameter of the first machine learning model and an eigenvector corresponding to the first data processing device. The first data processing device is further configured to receive a second intermediate result, where the second intermediate result is obtained based on a parameter of a second machine learning model and historical user data that is obtained by the second data processing device. The second intermediate result may be obtained based on a product of the parameter of the second machine learning model and an eigenvector corresponding to the historical user data obtained by the second data processing device. The second data processing device may obtain the historical user data in a plurality of manners. For example, the historical user data may be generated by the second data processing device, or the historical user data may be stored by the second data processing device. The first data processing device is further configured to update the parameter of the first machine learning model based on the first intermediate result and the second intermediate result. The first data processing device is further configured to send a third intermediate result to the second data processing device, where the third intermediate result is obtained from the first intermediate result based on the parameter of the first machine learning model and target historical user data in the historical user data obtained by the first data processing device, and an identifier of the target historical user data is the same as an identifier of the historical user data obtained by the second data processing device. In other words, there may be a plurality of different second data processing devices in the system, and a set of identifiers of historical user data obtained by the plurality of different second data processing devices is the same as a set of identifiers of the historical user data obtained by the first data processing device. The first data processing device sends different first intermediate results to the different second data processing devices based on the identifiers of the data. For example, there are two second data processing devices: a device 1 and a device 2. The device 1 obtains an intermediate result 1, an intermediate result 2, and an intermediate result 3 respectively for obtained historical user data 1, obtained historical user data 2, and obtained historical user data 3, that is, a second intermediate result includes the intermediate result 1, the intermediate result 2, and the intermediate result 3. The device 2 obtains an intermediate result 4, an intermediate result 5, and an intermediate result 6 respectively for maintained historical user data 4, maintained historical user data 5, and maintained historical user data 6, that is, the other second intermediate result includes the intermediate result 4, the intermediate result 5, and the intermediate result 6. It is assumed that alignment samples of the historical user data 1, the historical user data 2, and the historical user data 3 are historical user data 1', historical user data 2', and historical user data 3', respectively. That two pieces of historical user data are alignment samples means that the two pieces of historical user data have a same data identifier. For example, the historical user data 1 and the historical user data 1' have a same data identifier, the historical user data 2 and the historical user data 2' have a same data identifier, and the historical user data 3 and the historical user data 3' have a same data identifier. Alignment samples of the historical user data 4, the historical user data 5, and the historical user data 6 are historical user data 4', historical user data 5', and historical user data 6', respectively. The historical user data of the first data processing device includes the historical user data 1', the historical user data 2', the historical user data 3', the historical user data 4', the historical user data 5', and the historical user data 6'. It is assumed that intermediate results obtained by the first data processing device for the historical user data 1', the historical user data 2', the historical user data 3', the historical user data 4', the historical user data 5', and the historical user data 6' are an intermediate result 1', an intermediate result 2', an intermediate result 3', an intermediate result 4', an intermediate result 5', and an intermediate result 6', respectively. In other words, each of the intermediate result 1', the intermediate result 2', the intermediate result 3', the intermediate result 4', the intermediate result 5', and the intermediate result 6' is equivalent to a first intermediate result. The intermediate result 1', the intermediate result 2', and the intermediate result 3' are obtained based on the historical user data 1', the historical user data 2', and the historical user data 3', the historical user data 1', the historical user data 2', and the historical user data 3' are the alignment samples of the historical user data 1, the historical user data 2, and the historical user data 3, and the historical user data 1, the historical user data 2, and the historical user data 3 are the historical user data obtained by the device 1. Therefore, a first intermediate result sent by the first data processing device to the device 1 includes the intermediate result 1', the intermediate result 2', and the intermediate result 3'. Likewise, a first intermediate result sent by the first data processing device to the device 2 includes the intermediate result 4', the intermediate result 5', and the intermediate result 6'. In this embodiment of this disclosure, historical user data that has different feature space and same sample space is also referred to as alignment samples. The second data processing device is configured to update the parameter of the second machine learning model based on the third intermediate result and the second intermediate result.

In the solution provided in the first aspect, the first data processing device and the second data processing devices may be participants in vertical federated training, and the first data processing device sends different intermediate results to the different second data processing devices after generating the plurality of intermediate results. In this design manner, in a model training process, the first data processing device combines information provided by the historical user data obtained by the first data processing device, and may further combine information provided by the historical user data obtained by the plurality of second data processing devices. Compared with a solution in which only information provided by historical user data obtained by one second data processing device can be used, the solution provided in this embodiment of this disclosure can obtain a model with better performance, to better predict a decision of a user and provide more accurate recommendation information for the user. In addition, any two second data processing devices may be participants in horizontal federated training. Because the first data processing device updates, by using the information provided by the historical user data obtained by the plurality of second data processing devices, the parameter of the machine learning model maintained by the first data processing device, the first data processing device obtains the first intermediate results by continuously using an updated machine learning model, and transmits the different first intermediate results to the different second data processing devices. Then, the different second data processing devices may indirectly use information provided by historical user data obtained by other second data processing devices than the second data processing devices. In this manner, horizontal federated training and vertical federation training are combined, and a feasible manner of combining horizontal federation training and vertical federation training is provided, to better predict the decision of the user and provide more accurate recommendation information for the user.

In a possible implementation of the first aspect, the system includes a plurality of third data processing devices, historical user data obtained by any two third data processing devices has same feature space and different data identifiers, the second data processing device is any one of the plurality of third data processing devices, an initialized machine learning model is deployed in each third data processing device, and the second data processing device is further configured to: obtain parameters of a plurality of initialized machine learning models; perform weighted processing on the obtained parameters of the plurality of initialized machine learning models, to obtain a weighted value; and update, based on the weighted value, a parameter of an initialized machine learning model deployed in the second data processing device, to obtain the parameter of the second machine learning model. In this implementation, the parameters of the machine learning models maintained by the plurality of third data processing devices are updated by using the weighted value. In an initial status of each iterative training, the parameters of the machine learning models maintained by the third data processing devices are the same. Therefore, for the entire system, a quantity of parameters that need to be optimized is greatly reduced. This reduces needed computility, and is conducive to improving training efficiency.

According to a second aspect, an embodiment of this disclosure provides a user data processing method, including: A first data processing device obtains a first intermediate result, where the first intermediate result is obtained based on a parameter of a first machine learning model and historical user data that is obtained by the first data processing device. The first data processing device receives a second intermediate result, where the second intermediate result is obtained based on a parameter of a second machine learning model and historical user data that is obtained by a second data processing device. The first data processing device updates the parameter of the first machine learning model based on the first intermediate result and the second intermediate result. The first data processing device sends a third intermediate result to the second data processing device, where the third intermediate result is obtained from the first intermediate result based on the parameter of the first machine learning model and target historical user data in the historical user data obtained by the first data processing device, an identifier of the target historical user data is the same as an identifier of the historical user data of the second data processing device, and the third intermediate result and the second intermediate result are used to update the parameter of the second machine learning model.

In a possible implementation of the second aspect, the method further includes: The first data processing device generates a distributed public key based on an obtained first public key and an obtained second public key, where the first public key is generated by the first data processing device, and the second public key is generated by the second data processing device. The first data processing device performs homomorphic encryption on the third intermediate result by using the distributed public key, where a first private key or a second private key whose quantity is greater than a target quantity is used to decrypt the homomorphically encrypted third intermediate result, the first private key is generated by the first data processing device, and the second private key is generated by the second data processing device.

In a possible implementation of the second aspect, the method further includes: When learning that a quantity of online data processing devices in a system is less than a threshold, the first data processing device sends the homomorphically encrypted parameter of the first machine learning model to the online data processing device, so that the online data processing device decrypts the homomorphically encrypted parameter of the first machine learning model by using the first private key or the second private key of the online data processing device, where the threshold is greater than the target quantity.

In a possible implementation of the second aspect, the method further includes: The first data processing device receives the parameter that is of the first machine learning model and that is obtained after the online data processing device performs decryption by using the first private key or the second private key of the online data processing device.

In a possible implementation of the second aspect, the first intermediate result is specifically obtained based on the parameter of the first machine learning model, the historical user data of the first data processing device, and a target vector, and the method further includes: The first data processing device obtains the target vector based on a homomorphically encrypted first vector and a second vector, where the first vector has N dimensions, the N dimensions are corresponding to identifiers of all historical user data in the system, a value of a first dimension of the first vector indicates whether an identifier of first historical user data exists in the identifier of the historical user data obtained by the second data processing device, the first dimension is corresponding to the identifier of the first historical user data, the second vector and the first vector have same dimensions, and a value of a first dimension of the second vector indicates whether the identifier of the first historical user data exists in an identifier of the historical user data of the first data processing device.

In a possible implementation of the second aspect, the historical user data obtained by the first data processing device and the historical user data obtained by the second data processing device have different feature space.

According to a third aspect, an embodiment of this disclosure provides a user data processing method, including: A second data processing device receives a third intermediate result, where a first intermediate result is obtained based on a parameter of a first machine learning model and historical user data that is obtained by a first data processing device, the third intermediate result is obtained from the first intermediate result based on the parameter of the first machine learning model and target historical user data in the historical user data obtained by the first data processing device, and an identifier of the target historical user data is the same as an identifier of historical user data of the second data processing device. The second data processing device obtains a second intermediate result, where the second intermediate result is obtained based on a parameter of a second machine learning model and the historical user data that is obtained by the second data processing device, and the second intermediate result and the first intermediate result are used to update the parameter of the first machine learning model. The second data processing device updates the parameter of the second machine learning model based on the third intermediate result and the second intermediate result.

In a possible implementation of the third aspect, the method further includes: The second data processing device obtains parameters of a plurality of initialized machine learning models, where one initialized machine learning model is deployed in one third data processing device, historical user data obtained by any two third data processing devices has same feature space and different data identifiers, and the second data processing device is any one of the plurality of third data processing devices. The second data processing device performs weighted processing on the obtained parameters of the plurality of initialized machine learning models, to obtain a weighted value; and updates, based on the weighted value, a parameter of an initialized machine learning model deployed in the second data processing device, to obtain the parameter of the second machine learning model.

In a possible implementation of the third aspect, the method further includes: The second data processing device generates a distributed public key based on an obtained first public key and an obtained second public key, where the first public key is generated by the first data processing device, and the second public key is generated by the second data processing device. The second data processing device performs homomorphic encryption on the second intermediate result by using the distributed public key, where a first private key or a second private key whose quantity is greater than a target quantity is used to decrypt the homomorphically encrypted second intermediate result, the first private key is generated by the first data processing device, and the second private key is generated by the second data processing device.

In a possible implementation of the third aspect, the method further includes: When learning that a quantity of online data processing devices in a system is less than a threshold, the second data processing device sends the homomorphically encrypted parameter of the second machine learning model to the online data processing device, so that the online data processing device decrypts the homomorphically encrypted parameter of the second machine learning model by using a first private key or a second private key of the online data processing device, where the threshold is greater than the target quantity.

In a possible implementation of the third aspect, the method further includes: The second data processing device receives the parameter that is of the second machine learning model and that is obtained after the online data processing device performs decryption by using the first private key or the second private key of the online data processing device.

In a possible implementation of the third aspect, the second intermediate result is specifically obtained based on the parameter of the second machine learning model, the historical user data of the second data processing device, and a target vector, and the method further includes: The second data processing device obtains a first vector, where the first vector has N dimensions, the N dimensions are corresponding to identifiers of all historical user data in the system, a value of a first dimension of the first vector indicates whether an identifier of first historical user data exists in the identifier of the historical user data obtained by the second data processing device, and the first dimension is corresponding to the identifier of the first historical user data; and obtains the target vector based on a homomorphically encrypted second vector and the first vector, where the second vector and the first vector have same dimensions, and a value of a first dimension of the second vector indicates whether the identifier of the first historical user data exists in an identifier of the historical user data of the first data processing device.

In a possible implementation of the third aspect, the historical user data obtained by the first data processing device and the historical user data obtained by the second data processing device have different feature space.

According to a fourth aspect, an embodiment of this disclosure provides an offline processing method, including: A target data processing device generates a public key and a private key. The target data processing device receives public keys that are separately generated and sent by other data processing devices in a system in which the target data processing device is located, to generate a distributed public key. The target data processing device performs homomorphic encryption on target data by using the distributed public key, where the target data includes a parameter of a target machine learning model deployed in the target data processing device, and private keys that are in private keys generated by the other data processing devices and whose quantity is greater than a target quantity are used to decrypt the homomorphically encrypted target data. When learning that a quantity of online data processing devices in the other data processing devices is less than a threshold, the target data processing device sends the homomorphically encrypted target data to the online data processing device, so that the online data processing device decrypts the homomorphically encrypted target data by using a private key generated by the online data processing device.

In a possible implementation of the fourth aspect, the method further includes: The target data processing device receives the target data that is obtained after the online data processing device performs decryption by using the private key generated by the online data processing device.

In a possible implementation of the fourth aspect, when the target data processing device is a first data processing device, the method further includes: The target data processing device obtains a first intermediate result, where the first intermediate result is obtained based on a parameter of a first machine learning model and historical user data that is obtained by the first data processing device. The target data processing device receives a second intermediate result, where the second intermediate result is obtained based on a parameter of a second machine learning model and historical user data that is obtained by a second data processing device. The target data processing device updates the parameter of the first machine learning model based on the first intermediate result and the second intermediate result.

The target data processing device sends a third intermediate result to the second data processing device, where the third intermediate result is obtained based on the parameter of the first machine learning model and target historical user data in historical user data obtained by the target data processing device, an identifier of the target historical user data is the same as an identifier of the historical user data of the second data processing device, and the third intermediate result and the second intermediate result are used to update the parameter of the second machine learning model.

In a possible implementation of the fourth aspect, the first intermediate result is specifically obtained based on the parameter of the first machine learning model, the historical user data of the first data processing device, and a target vector, and the method further includes: The target data processing device obtains the target vector based on a homomorphically encrypted first vector and a second vector, where the first vector has N dimensions, the N dimensions are corresponding to identifiers of all historical user data in the system, a value of a first dimension of the first vector indicates whether an identifier of first historical user data exists in the identifier of the historical user data obtained by the second data processing device, the first dimension is corresponding to the identifier of the first historical user data, the second vector and the first vector have same dimensions, and a value of a first dimension of the second vector indicates whether the identifier of the first historical user data exists in an identifier of the historical user data of the first data processing device.

In a possible implementation of the fourth aspect, when the target data processing device is a second data processing device, the method further includes: The target data processing device receives a third intermediate result, where a first intermediate result is obtained based on a parameter of a first machine learning model and historical user data that is obtained by a first data processing device, the third intermediate result is obtained from the first intermediate result based on the parameter of the first machine learning model and target historical user data in the historical user data obtained by the first data processing device, and an identifier of the target historical user data is the same as an identifier of historical user data of the second data processing device. The target data processing device obtains a second intermediate result, where the second intermediate result is obtained based on a parameter of a second machine learning model and the historical user data that is obtained by the second data processing device, and the second intermediate result and the first intermediate result are used to update the parameter of the first machine learning model. The target data processing device updates the parameter of the second machine learning model based on the third intermediate result and the second intermediate result.

In a possible implementation of the fourth aspect, the method further includes: The target data processing device obtains parameters of a plurality of initialized machine learning models, where one initialized machine learning model is deployed in one third data processing device, historical user data obtained by any two third data processing devices has same feature space and different data identifiers, and the second data processing device is any one of the plurality of third data processing devices. The target data processing device performs weighted processing on the obtained parameters of the plurality of initialized machine learning models, to obtain a weighted value. The target data processing device updates, based on the weighted value, a parameter of an initialized machine learning model deployed in the target data processing device, to obtain the parameter of the second machine learning model.

In a possible implementation of the fourth aspect, the second intermediate result is specifically obtained based on the parameter of the second machine learning model, the historical user data of the second data processing device, and a target vector, and the method further includes: The target data processing device obtains a first vector, where the first vector has N dimensions, the N dimensions are corresponding to identifiers of all historical user data in the system, a value of a first dimension of the first vector indicates whether an identifier of first historical user data exists in the identifier of the historical user data obtained by the second data processing device, and the first dimension is corresponding to the identifier of the first historical user data. The target data processing device obtains the target vector based on a homomorphically encrypted second vector and the first vector, where the second vector and the first vector have same dimensions, and a value of a first dimension of the second vector indicates whether the identifier of the first historical user data exists in an identifier of the historical user data of the first data processing device.

According to a fifth aspect, an embodiment of this disclosure provides a data processing system. The system includes a first data processing device and a second data processing device. The first data processing device is configured to: obtain a first intermediate result, where the first intermediate result is obtained based on a parameter of a first machine learning model and a training sample that is obtained by the first data processing device; receive a second intermediate result, where the second intermediate result is obtained based on a parameter of a second machine learning model and a training sample that is obtained by the second data processing device; update the parameter of the first machine learning model based on the first intermediate result and the second intermediate result; and send a third intermediate result to the second data processing device, where the third intermediate result is obtained based on the parameter of the first machine learning model and a target training sample in the training sample obtained by the first data processing device, and an identifier of the target training sample is the same as an identifier of the training sample obtained by the second data processing device. The second data processing device is configured to update the parameter of the second machine learning model based on the third intermediate result and the second intermediate result.

In a possible implementation of the fifth aspect, the system includes a plurality of third data processing devices, training samples obtained by any two third data processing devices have same feature space and different sample identifiers, the second data processing device is any one of the plurality of third data processing devices, an initialized machine learning model is deployed in each third data processing device, and the second data processing device is further configured to: obtain parameters of a plurality of initialized machine learning models; perform weighted processing on the obtained parameters of the plurality of initialized machine learning models, to obtain a weighted value; and update, based on the weighted value, a parameter of an initialized machine learning model deployed in the second data processing device, to obtain the parameter of the second machine learning model.

In a possible implementation of the fifth aspect, the first data processing device is further configured to generate a first public key and a first private key. The second data processing device is further configured to generate a second public key and a second private key, where the first public key and the second public key are used to generate a distributed public key, the distributed public key is used to perform homomorphic encryption on the first intermediate result or the second intermediate result, and a first private key or a second private key whose quantity is greater than a target quantity is used to decrypt the homomorphically encrypted first intermediate result or the homomorphically encrypted second intermediate result.

In a possible implementation of the fifth aspect, the second data processing device is further configured to: when learning that a quantity of online data processing devices in the system is less than a threshold, send the homomorphically encrypted parameter of the second machine learning model to the online data processing device, so that the online data processing device decrypts the homomorphically encrypted parameter of the second machine learning model by using a first private key or a second private key of the online data processing device, where the threshold is not less than the target quantity.

In a possible implementation of the fifth aspect, the second data processing device is further configured to receive the parameter that is of the second machine learning model and that is obtained after the online data processing device performs decryption by using the first private key or the second private key of the online data processing device.

In a possible implementation of the fifth aspect, the first data processing device is further configured to: when learning that the quantity of online data processing devices in the system is less than the threshold, send the homomorphically encrypted parameter of the first machine learning model to the online data processing device, so that the online data processing device decrypts the homomorphically encrypted parameter of the first machine learning model by using the first private key or the second private key of the online data processing device, where the threshold is greater than the target quantity.

In a possible implementation of the fifth aspect, the first data processing device is further configured to receive the parameter that is of the first machine learning model and that is obtained after the online data processing device performs decryption by using the first private key or the second private key of the online data processing device.

In a possible implementation of the fifth aspect, the second intermediate result is specifically obtained based on the parameter of the second machine learning model, the training sample obtained by the second data processing device, and a target vector, and the second data processing device is further configured to: obtain a first vector, where the first vector has N dimensions, the N dimensions are corresponding to identifiers of all training samples in the system, a value of a first dimension of the first vector indicates whether an identifier of a first training sample exists in the identifier of the training sample obtained by the second data processing device, and the first dimension is corresponding to the identifier of the first training sample; and obtain the target vector based on a homomorphically encrypted second vector and the first vector, where the second vector and the first vector have same dimensions, and a value of a first dimension of the second vector indicates whether the identifier of the first training sample exists in an identifier of the training sample obtained by the first data processing device.

In a possible implementation of the fifth aspect, the first intermediate result is specifically obtained based on the parameter of the first machine learning model, the training sample obtained by the first data processing device, and the target vector, and the first data processing device is further configured to:

obtain the target vector based on the homomorphically encrypted first vector and the second vector.

In a possible implementation of the fifth aspect, the training sample obtained by the first data processing device and the training sample obtained by the second data processing device have different feature space and a same sample identifier.

According to a sixth aspect, this disclosure provides a user data processing apparatus. The user data processing apparatus is configured to perform the steps performed by the first data processing device, the second data processing device, or the target data processing device in any one of the possible implementations provided in the second aspect to the fourth aspect.

In a possible design manner, in this disclosure, functional modules of the first data processing device, the second data processing device, and the target data processing device may be obtained through division according to any one of the methods provided in the second aspect to the fourth aspect. For example, each functional module may be obtained through division based on each corresponding function, or at least two functions may be integrated into one processing module.

For example, in this disclosure, a data processing device may be divided into a transceiver module, a processing module, and the like based on functions. For descriptions of possible technical solutions and beneficial effects achieved by the foregoing functional modules obtained through division, refer to the technical solution provided in the second aspect or the corresponding possible implementations of the second aspect, the technical solution provided in the third aspect or the corresponding possible implementations of the third aspect, or the technical solution provided in the fourth aspect or the corresponding possible implementations of the fourth aspect. Details are not described herein again.

In another possible design, the user data processing apparatus includes a memory and a processor, and the memory is coupled to the processor. The memory is configured to store computer instructions, and the processor is configured to invoke the computer instructions, to perform the method provided in the second aspect or the corresponding possible implementations of the second aspect, the method provided in the third aspect or the corresponding possible implementations of the third aspect, or the method provided in the fourth aspect or the corresponding possible implementations of the fourth aspect.

According to a seventh aspect, this disclosure provides a computer-readable storage medium, for example, a non-transient computer-readable storage medium. The computer-readable storage medium stores a computer program (or instructions). When the computer program (or the instructions) is run on a computer device, the computer device is enabled to perform the method provided in the second aspect or the corresponding possible implementations of the second aspect, the method provided in the third aspect or the corresponding possible implementations of the third aspect, or the method provided in the fourth aspect or the corresponding possible implementations of the fourth aspect.

According to an eighth aspect, this disclosure provides a computer program product. When the computer program product runs on a computer device, the method provided in the second aspect or the corresponding possible implementations of the second aspect, the method provided in the third aspect or the corresponding possible implementations of the third aspect, or the method provided in the fourth aspect or the corresponding possible implementations of the fourth aspect is performed.

According to a ninth aspect, this disclosure provides a chip system, including a processor. The processor is configured to invoke, from a memory, a computer program stored in the memory and run the computer program, to perform the method provided in the second aspect or the corresponding possible implementations of the second aspect, the method provided in the third aspect or the corresponding possible implementations of the third aspect, or the method provided in the fourth aspect or the corresponding possible implementations of the fourth aspect.

It can be understood that any system, apparatus, computer storage medium, computer program product, chip system, or the like provided above can be applied to the corresponding method provided in the second aspect, the third aspect, or the fourth aspect.

In this disclosure, names of any one of the foregoing apparatuses do not impose any limitation on devices or functional modules. In actual implementation, these devices or functional modules may have other names and fall within the scope of the claims and equivalent technologies of this disclosure, provided that functions of the devices or functional modules are similar to those in this disclosure.

BRIEF DESCRIPTION OF DRAWINGS

FIG. 6A and FIG. 6B are a schematic flowchart of another machine learning model update method according to an embodiment of this disclosure;

FIG. 7 is a schematic flowchart of an offline processing method according to an embodiment of this disclosure;

DESCRIPTION OF EMBODIMENTS

The following describes technical solutions in embodiments of this disclosure with reference to the accompanying drawings in embodiments of this disclosure. It is clear that the described embodiments are merely some but not all embodiments of this disclosure. All other embodiments obtained by a person skilled in the art based on embodiments of this disclosure without creative efforts fall within the protection scope of this disclosure.

Embodiments of this disclosure provide a federated learning system and a federated learning-based data processing method and apparatus. For better understanding of the solutions provided in embodiments of this disclosure, the following first describes research ideas of the solutions provided in embodiments of this disclosure.

Federated learning is a distributed machine learning paradigm that enables a plurality of parties to use all respective data to collaboratively train an artificial intelligence (AI) model without aggregating data of the plurality of parties. In a conventional machine learning paradigm, a large amount of data for model training needs to be aggregated, and the data used for training may come from a plurality of different organizations, users, participants, or clients. If data of a plurality of parties is aggregated, data leakage is highly likely to occur. For organizations, information assets may be exposed. For individual users, personal privacy may be disclosed. The foregoing problems pose a severe challenge to AI model training. To resolve the foregoing problems, a federated learning technology emerges. Federated learning allows data of a plurality of parties to be retained locally and not to be aggregated. The plurality of parties (securely) exchange intermediate computation results through collaborative computing to jointly train an AI model. The federated learning technology protects the data of the plurality of users and can make full use of the data of the plurality of parties to collaboratively train a model, thereby obtaining a more powerful model.

Federated learning can be classified into horizontal federation and vertical federation based on scenarios. Horizontal federation is confronted with multi-party collaborative modeling in which data features are the same but data distribution is inconsistent. In other words, training data of participants in the horizontal federation has same feature space but different sample space. Vertical federation is confronted with collaborative modeling in scenarios in which data features are different but a plurality of parties have a same sample (user). In other words, training data of the participants in the vertical federation has different feature space but same sample space.

Figure 1:
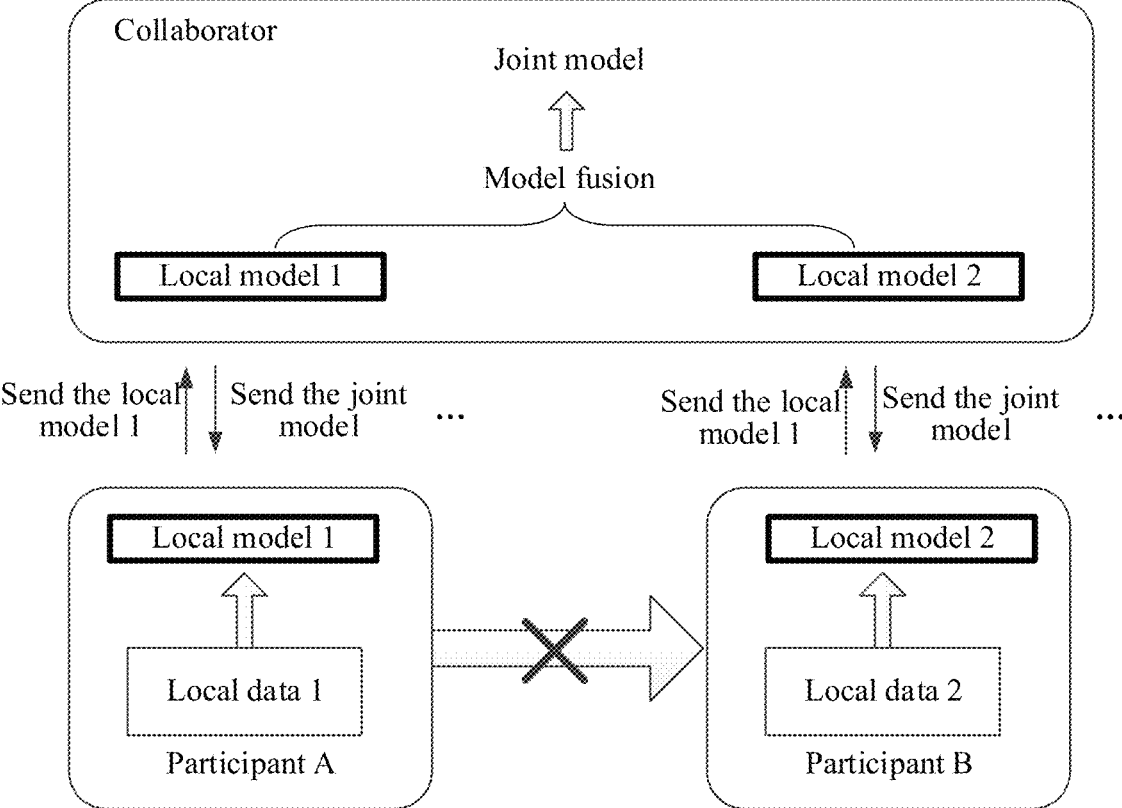
FIG. 1 is a schematic diagram of an architecture of a horizontal federated learning system.

FIG. 1 is a schematic diagram of an architecture of a horizontal federated learning system. A structure of the horizontal federated learning system generally includes one collaborator and a plurality of clients as participants. In addition, training data of models maintained by the plurality of participants is characterized by same data feature space but different sample space. A workflow mainly includes model delivery and model fusion processes. In the model delivery process, the participants download models from the collaborator, train, based on locally stored training data, the models downloaded from the collaborator, and upload the models to the collaborator after the models are trained to some extent. Training to some extent can be understood as training is performed a fixed quantity of rounds. In the model fusion process, the collaborator collects the models uploaded by the participants and fuses the models. The two processes, namely, the model delivery process and the model fusion process, are iterated repeatedly until the models are converged.

It should be noted that in this disclosure, the collaborator is sometimes referred to as a central server or a server, and the two have a same meaning. In some possible implementations, the server may be a cloud server or a cloud-side device. This is not limited in embodiments of this disclosure. In this disclosure, the client is sometimes referred to as a terminal-side device, a data processing apparatus, or a user information management device, and these names have a same meaning. The terminal-side device may be a terminal, for example, a mobile phone terminal, a tablet computer, a notebook computer, an augmented reality (AR)/virtual reality (VR) device, a vehicle-mounted terminal, a device used for security protection (for example, a surveillance camera device, a smoke alarm device, or a fire extinguishing device), or a smart speaker, or may be a physical machine, a virtual machine, or an all-in-one machine. In addition, it should be noted that the model in this disclosure includes a neural network model. A specific type of the model is not limited in this disclosure. For example, the model in this disclosure may be a convolutional neural network model, a recurrent neural network model, a deep residual network model, or the like. The following does not repeat content in this paragraph.

Figure 2:
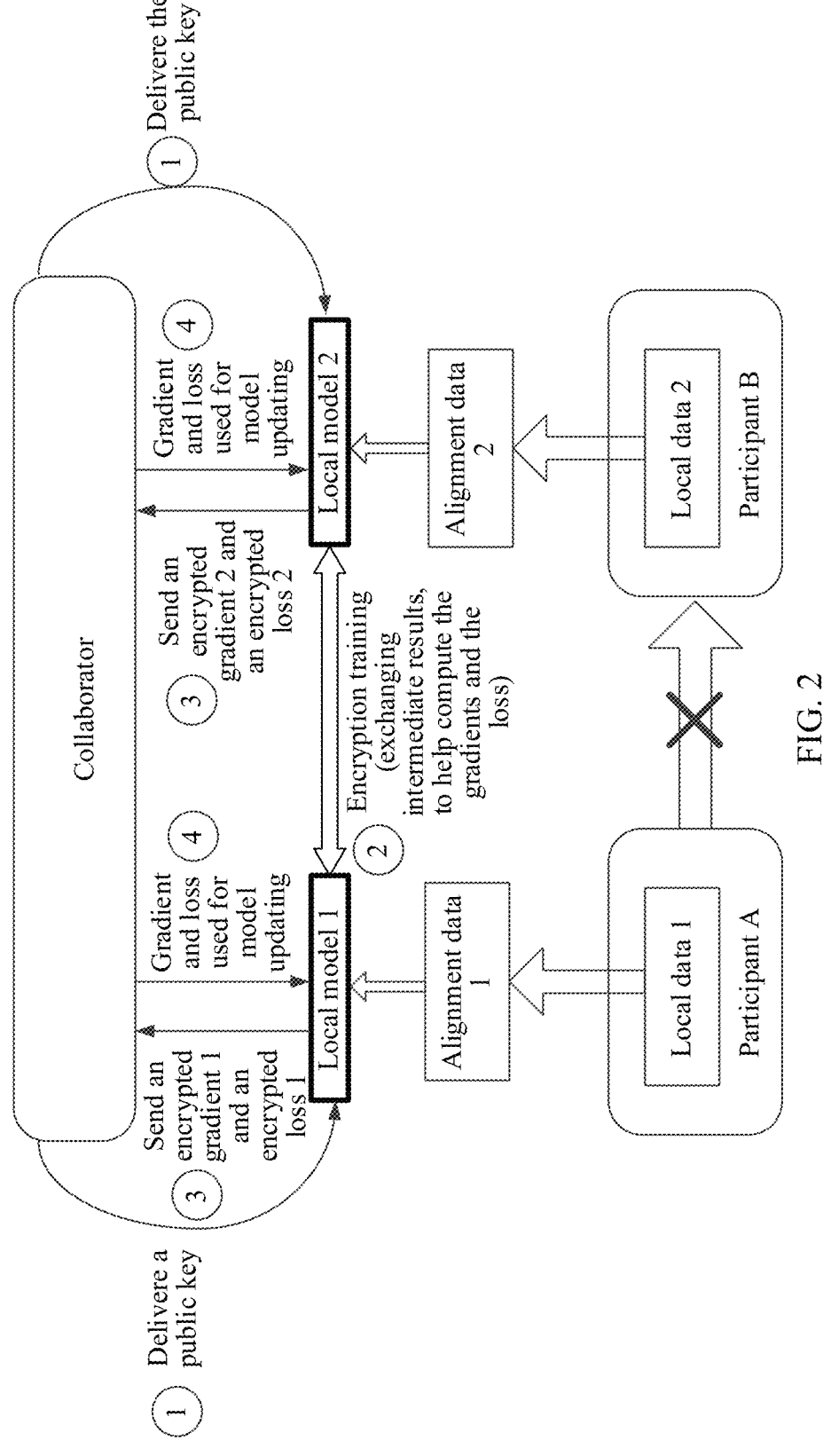
FIG. 2 is a schematic diagram of an architecture of a vertical federated learning system.

FIG. 2 is a schematic diagram of an architecture of a vertical federated learning system. A structure of the vertical federated learning system generally includes one collaborator and a plurality of clients as participants. In addition, training data of models maintained by the plurality of participants is characterized by different data feature space but same sample space. In the vertical federated learning system, user groups of the plurality of participants are different, and alignment processing needs to be performed on data maintained by the plurality of parties, to ensure that sample space of training samples of the models maintained by the plurality of parties is the same. Moreover, in the vertical federated learning system, the plurality of parties need to exchange intermediate computation results, so that the plurality of parties compute a loss value and gradient values. In view of this, the collaborator creates a key pair and sends a public key to the plurality of participants. The participants use the public key to encrypt and exchange the intermediate results obtained by the participants. The intermediate results are used to help compute the gradient values and the loss value. The participants compute the encrypted gradients and add additional masks separately to the encrypted gradients. One of the participants also computes the encrypted loss. The plurality of participants separately send encryption results to the collaborator. The collaborator decrypts the gradient and loss information, and sends results back to the plurality of participants. The plurality of participants remove the masks on the gradient information, and update parameters of the local models based on these pieces of gradient information.

Different training solutions are provided for horizontal federation and vertical federation in different scenarios. Specifically, for horizontal federation, only data in same feature space and different sample space can be used as training samples to train a model, and for vertical federation, only data in different feature space and same sample space can be used as training samples to train a model. Consequently, application scenarios of federated learning are limited. For example, currently, data in same feature space and different sample space and data in different feature space and same sample space cannot be simultaneously used as training samples to train a model. Specific scenarios may include scenarios in which data of different telecom operators (data in same feature space and different sample space) and data of different e-commerce service providers (the data of the e-commerce service provider and the data of the telecom operator have different feature space and same sample space) need to be used to jointly train a model. In addition, because the training samples used cannot provide sufficient information, performance of a trained model is not good enough, and a prediction result of the trained model is not accurate enough.

The applicant finds the foregoing problems, and proposes a feasible solution, so that data in same feature space and different sample space and data in different feature space and same sample space can be simultaneously used as training samples to train a model. The solution provided in this embodiment of this disclosure can expand application scenarios of federated learning, and improve performance of a model, making a prediction result of the trained model more accurate.

Based on the foregoing research ideas, the following describes the solutions provided in embodiments of this disclosure.

Figure 3:
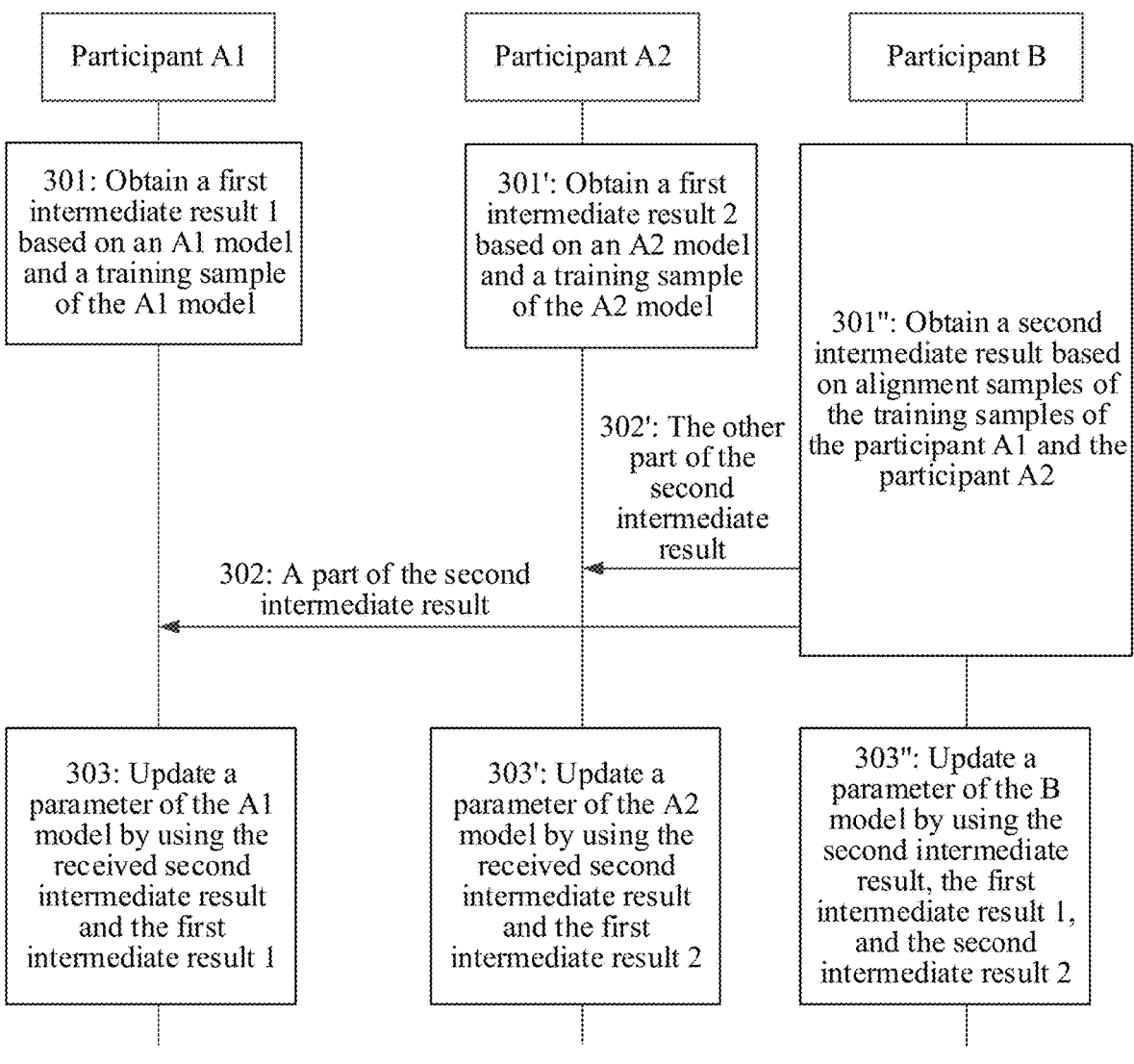
FIG. 3 is a schematic flowchart of a machine learning model update method according to an embodiment of this disclosure.

FIG. 3 is a schematic diagram of an architecture of a federated learning system according to an embodiment of this disclosure. The system provided in this embodiment of this disclosure includes at least three participants. The participants are sometimes referred to as devices, apparatuses, or clients in this embodiment of this disclosure, and these names have a same meaning. Each participant maintains data of the participant and uses the data of the participant to train a model. Specifically, the following uses three participants A1, A2, and B as an example to describe the solutions provided in embodiments of this disclosure.

In a possible implementation, a training sample of a model maintained by the participant A1 and a training sample of a model maintained by the participant A2 have same feature space and different sample space. A training sample of a model maintained by the participant B and the training sample of the model maintained by the participant A1 (or A2) have different feature space and same sample space. In this embodiment of this disclosure, training samples that have different feature space and same sample space are also referred to as alignment samples. For case of description, the participant A1 and the participant A2 are referred to as type-A users (or type-A participants or type A participants), and the participant B is referred to as a type-B user (or a type-B participant or a type B participant) below. Assuming that F represents a feature set of data in the federated learning system, the feature set is F={$f_1$, $f_2$, . . . >$f_N$>$f_{N+1}$, $f_{N+2}$, . . . , $f_{N+M}$}, where the first N features belong to the type-A users and the last M features belong to the type-B user.

The type-A users are corresponding to a feature subset $F_A$={$f_1$, $f_2$, . . . , $f_N$}.

The type-B user is corresponding to a feature subset $F_B$={$f_{N+1}$, $f_{N+2}$, . . . , $f_{N+M}$}.

The two types of users participating in the federation in this scenario are described from a feature dimension. The two types of users have different data features, namely, $F_A$ and $F_B$. In a possible implementation, it can be understood that a first vector set is used to represent each piece of data of the type-A users, and a second vector set is used to represent each piece of data of the type-B user. Distribution of the first vector set is different from distribution of the second vector set.

The following describes same sample space: It is assumed that D is used to represent a set of all objects determined based on training samples related to each object in the federated learning system. In this case, D=[$d_1$, $d_2$, $d_3$, . . . , $d_P$]$^T$, and related data of a same object is maintained by the type-A users and is also maintained by the type-B user. It can be understood that the type-A users and the type-B user have same sample space, and can be understood that the federated learning system logically has P objects, where $d_p$ represents a $p^{th}$ piece of data and has N+M features, that is:

$$d_p = \left[ d_p^{f1}, d_p^{f2}, \ldots , d_p^{fN}, d_p^{N+1}, \ldots , d_p^{fN+M} \right].$$

Each object may be divided into two parts based on the feature subset $F_A$ and the feature subset $F_B$:

$$d_p = \left[ d_p^{f1}, d_p^{f2}, \ldots , d_p^{fN}, d_p^{N+1}, \ldots , d_p^{fN+M} \right] = \left[ d_p^A, d_p^B \right],$$

where $$d_p^A$$

is an eigenvalue corresponding to the feature subset $F^A$, that is, $$d_p^A = \left[ d_p^{f1}, d_p^{f2}, \ldots , d_p^{fN} \right];$$

and $$d_p^B$$

is an eigenvalue corresponding to the feature subset $F^B$, that is, $$d_p^B = \left[ d_p^{fN+1}, d_p^{fN+2}, \ldots , d_p^{fN+M} \right].$$

D may be divided into two data subsets $D^A$, $D^B$ based on the feature subset $F^A$ and the feature subset $F^B$, that is:

$$D = [d_1, d_2, d_3, \ldots , d_P]^T = \begin{bmatrix} d_1^A & d_1^B \\ \vdots & \vdots \\ d_P^A & d_P^B \end{bmatrix} = \left[ D^A, D^B \right], \text{ where}$$

$$D^A = \left[ d_1^A, d_2^A, \ldots , d_P^A \right]^T \text{ and } D^B = \left[ d_1^B, d_2^B, \ldots , d_P^B \right]^T.$$

The data subset including data of the type-A users is $$D^A = \left[ d_1^A, d_2^A, \ldots , d_P^A \right]^T.$$

The data subset of the type-B user is $$D^B = \left[ d_1^B, d_2^B, \ldots , d_P^B \right]^T.$$

A data label of the type-B user is Y={$y_1$, $y_2$, . . . , $y_P$}.

The data label Y of the type-B user is used to distinguish between different objects, and the data label Y of the type-B user is a logical concept.

Physically, there may be a plurality of type-A users and type-B users. The type-A users may be divided into a total of N users from A1 to AN, and the type-B users may also be divided into a total of N users from B1 to BN. The data $D^A$, $D^B$, and Y defined above may be split into different real physical datasets based on specific physical data splitting and real physical data distribution. The dataset $D^A$ may be split into $D^{A1}$ to $D^{AN}$, the dataset $D^B$ may be split into $D^{B1}$ to $D^{BN}$, and the label Y may be split into $Y^1$ to $Y^N$.

In this implementation, the training samples of the models maintained by the participants included in the system may be data in same feature space and different sample space, or may be data in different feature space and same sample space.

301: The participant A1 obtains a first intermediate result 1 based on an A1 model (a parameter of the AI model) and a training sample of the AI model.

In a process of training the models maintained by the participant in the federated learning system, outputs of the models maintained by the participants need to be jointly used for determining. In this embodiment of this disclosure, an output obtained by each participant is referred to as an intermediate result, to distinguish the intermediate result from a final prediction result.

The training sample of the AI model is used as an input of the AI model to obtain the first intermediate result 1. Specifically, feature extraction may be performed on the training sample based on the AI model to obtain an eigenvector, and then a multiplication operation is performed based on the eigenvector and the parameter of the AI model to obtain the first intermediate result 1.

The training sample of the AI model is data that can be obtained by the participant A1, for example, may be data generated by the participant A1, data stored by the participant A1, or data that the participant A1 has permission to obtain. In this disclosure, the participant A1 may obtain the training sample in a plurality of manners. A data type of the training sample may be user data, service data, product data, or the like. There may be a plurality of data types for the training sample in this embodiment of this disclosure. In a implementation, the data type of the training sample is user data.

301': The participant A2 obtains a first intermediate result 2 based on an A2 model (a parameter of the A2 model) and a training sample of the A2 model.

Step 301' can be understood with reference to the step performed by the participant A1 in step 301. Details are not described herein again.

301": The participant B obtains a second intermediate result based on alignment samples of the training samples of the participant A1 and the participant A2.

For understanding of the alignment samples, refer to the foregoing descriptions. Details are not described herein again. The following describes manners of obtaining the alignment samples of the training samples of the participant B and the participant A1 and obtaining the alignment samples of the training samples of the participant B and the participant A2. Details are not described herein.

The participant B obtains the second intermediate result based on a parameter of a B model maintained by the participant B and the alignment samples of the training samples of the participant A1 and the participant A2. For a process of obtaining an intermediate result based on a training sample of a model, refer to the step performed by the participant A1 in step 301 for understanding. Details are not described herein again.

In a possible implementation, different weights may be set for different obtained second intermediate results based on a quantity of training samples of the participant A1 and a quantity of training samples of the participant A2. For example, if the quantity of training samples of the participant A1 is greater than the quantity of training samples of the participant A2, a weight of a second intermediate result obtained by using the alignment sample of the training sample of the participant A1 is greater than a weight of a second intermediate result obtained by using the alignment sample of the training sample of the participant A2. For another example, if the quantity of training samples of the participant A1 is less than the quantity of training samples of the participant A2, a weight of a second intermediate result obtained by using the alignment sample of the training sample of the participant A1 is less than a weight of a second intermediate result obtained by using the alignment sample of the training sample of the participant A2. In this manner, a first weighted value can better reflect information carried in the training sample of the participant A1 and information carried in the training sample of the participant A2.

302: The participant B sends a part of the second intermediate result to the participant A1 based on the alignment samples.

302': The participant B sends the other part of the second intermediate result to the participant A2 based on the alignment samples.

Step 302 and step 302' indicate that the participant B sends different second intermediate results to different type-A participants based on the alignment samples.

For example, the participant A1 obtains an intermediate result 1, an intermediate result 2, and an intermediate result 3 respectively for a maintained training sample 1, a maintained training sample 2, and a maintained training sample 3, that is, the first intermediate result 1 includes the intermediate result 1, the intermediate result 2, and the intermediate result 3. The participant A2 obtains an intermediate result 4, an intermediate result 5, and an intermediate result 6 respectively for a maintained training sample 4, a maintained training sample 5, and a maintained training sample 6, that is, the other first intermediate result (the first intermediate result 2) includes the intermediate result 4, the intermediate result 5, and the intermediate result 6. It is assumed that alignment samples of the training sample 1, the training sample 2, and the training sample 3 are a training sample 1', a training sample 2', and a training sample 3', respectively, and alignment samples of the training sample 4, the training sample 5, and the training sample 6 are a training sample 4', a training sample 5', and a training sample 6', respectively. Training samples of the participant B include the training sample 1', the training sample 2', the training sample 3', the training sample 4', the training sample 5', and the training sample 6'. It is assumed that intermediate results obtained by the participant B for the training sample 1', the training sample 2', the training sample 3', the training sample 4', the training sample 5', and the training sample 6' are an intermediate result 1', an intermediate result 2', an intermediate result 3', an intermediate result 4', an intermediate result 5', and an intermediate result 6', respectively. In other words, each of the intermediate result 1', the intermediate result 2', the intermediate result 3', the intermediate result 4', the intermediate result 5', and the intermediate result 6' is equivalent to a second intermediate result. The intermediate result 1', the intermediate result 2', and the intermediate result 3' are obtained based on the training sample 1', the training sample 2', and the training sample 3', the training sample 1', the training sample 2', and the training sample 3' are the alignment samples of the training sample 1, the training sample 2, and the training sample 3, and the training sample 1, the training sample 2, and the training sample 3 are the training samples maintained by the participant A1. Therefore, the second intermediate result sent by the participant B to the participant A1 includes the intermediate result 1', the intermediate result 2', and the intermediate result 3'. Likewise, the second intermediate result sent by the participant B to the participant A2 includes the intermediate result 4', the intermediate result 5', and the intermediate result 6'.

303: The participant A1 updates the parameter of the AI model by using the received second intermediate result and the first intermediate result 1.

303': The participant A2 updates the parameter of the A2 model by using the received second intermediate result and the first intermediate result 2.

303": The participant B updates the parameter of the B model by using the second intermediate result, the first intermediate result 1, and the first intermediate result 2.

In the solution provided in this embodiment of this disclosure, the participant B and the participant A1 are participants in vertical federated training, and the participant B and the participant A2 are participants in vertical federated training. After obtaining the plurality of first intermediate results, the participant B sends different second intermediate results to the participant A1 and the participant A2. In this design manner, in a model training process, the participant B combines information provided by the training sample maintained by the participant B and information provided by the samples maintained by the participant A1 and the participant A2. Compared with a solution in which only information provided by the sample maintained by the participant A1 or information provided by the sample maintained by the participant A2 can be used, the solution provided in this embodiment of this disclosure can obtain a model with better performance. In addition, the participant A1 and the participant A2 are participants in horizontal federated training. Because the participant B updates, by using the information provided by the samples maintained by the participant A1 and the participant A2, the parameter of the model maintained by the participant B, the participant B obtains the second intermediate results by continuously using an updated model, and transmits the different second intermediate results to the participant A1 and the participant A2. Then, the participant A1 and the participant A2 may indirectly use information provided by samples maintained by other type-A devices than the participant A1 and the participant A2.

Figure 4:
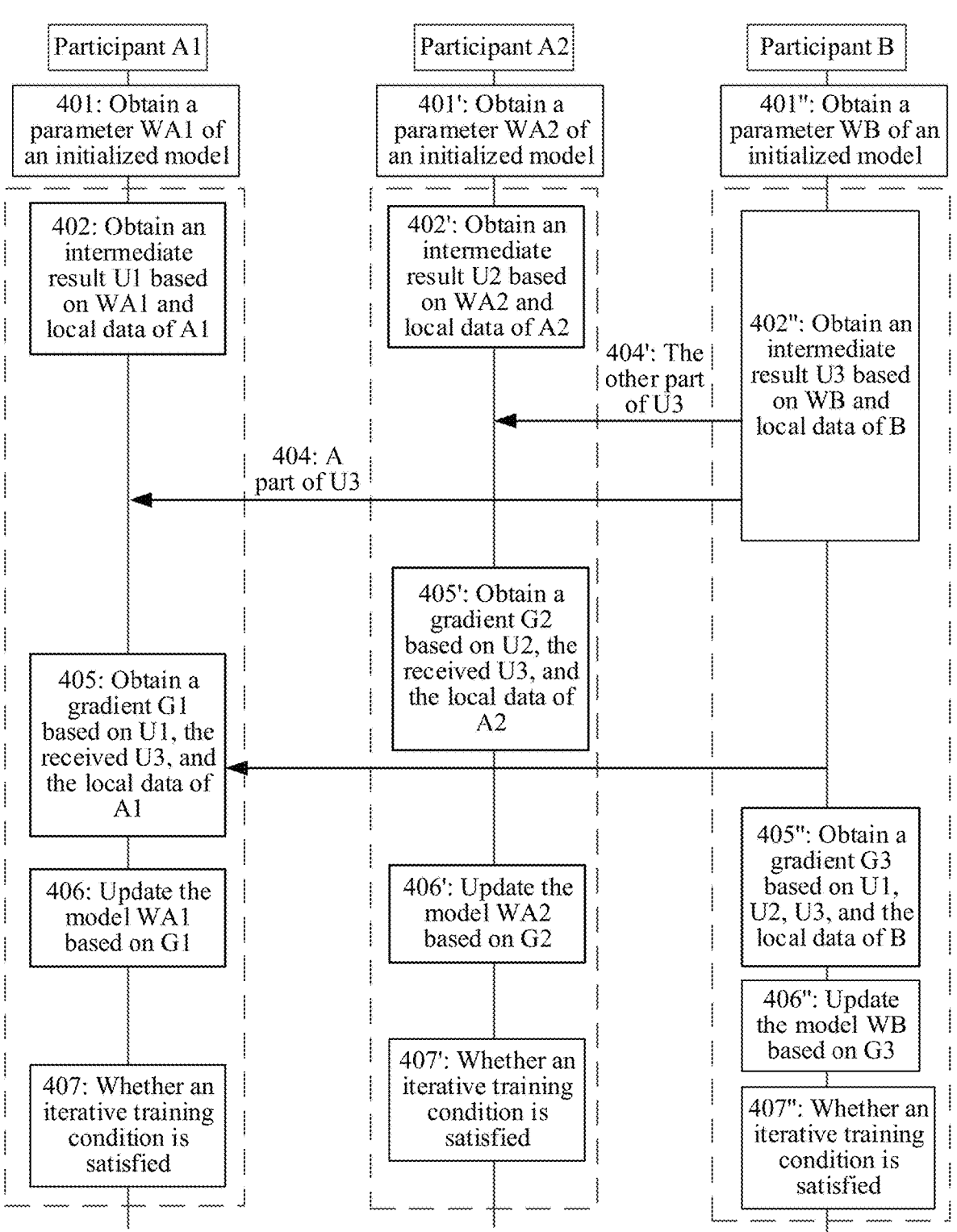
FIG. 4 is a schematic flowchart of another machine learning model update method according to an embodiment of this disclosure.

For better understanding of the embodiment corresponding to FIG. 3, the following further describes, with reference to FIG. 4, the solutions provided in embodiments of this disclosure.

401: A participant A1 obtains a parameter WA1 of an initialized model.

In an initial status, the initial status can be understood as follows: The participant A1 obtains the parameter of the initialized model before a training process starts. The model in this disclosure includes a neural network model. A specific type of the model is not limited in this disclosure. For example, the model in this disclosure may be a convolutional neural network model, a recurrent neural network model, a deep residual network model, or the like. The following does not repeat a definition and understanding of the model.

In a possible implementation, the participant A1 may locally obtain the initialized model, and randomly initialize the parameter of the initialized model.

In a possible implementation, the participant A1 may obtain the initialized model from another device, for example, obtain the initialized model from a cloud-side device.

401': A participant A2 obtains a parameter WA2 of an initialized model.

In a possible implementation, the participant A2 may locally obtain the initialized model, and randomly initialize the parameter of the initialized model.

In a possible implementation, the participant A2 may obtain the initialized model from another device, for example, obtain the initialized model from the cloud-side device.

In a possible implementation, the initialized model obtained by the participant A2 is the same as the initialized model obtained by the participant A1, that is, WA2 is the same as WA1. In a possible implementation, the initialized model obtained by the participant A2 is different from the initialized model obtained by the participant A1, that is, WA2 is different from WA1.

401": A participant B obtains a parameter WB of an initialized model.

In a possible implementation, the participant B may locally obtain the initialized model, and randomly initialize the parameter of the initialized model.

In a possible implementation, the participant B may obtain the initialized model from another device, for example, obtain the initialized model from the cloud-side device.

402: The participant A1 obtains an intermediate result U1 based on WA1 and local data of A1.

Step 402 can be understood with reference to step 301 in the embodiment corresponding to FIG. 3. Feature extraction may be performed on the local data of A1 based on the model maintained by the participant A1, to obtain an eigenvector, and then a multiplication operation is performed based on the eigenvector and the parameter (WA1 herein) of the model maintained by the participant A1, to obtain the intermediate result U1.

402': The participant A2 obtains an intermediate result U2 based on WA2 and local data of A2.

Step 402' can be understood with reference to step 301' in the embodiment corresponding to FIG. 3. Feature extraction may be performed on the local data of A2 based on the model maintained by the participant A2, to obtain an eigenvector, and then a multiplication operation is performed based on the eigenvector and the parameter (WA2 herein) of the model maintained by the participant A2, to obtain the intermediate result U2.

402": The participant B obtains an intermediate result U3 based on WB and local data of B.

Step 402" can be understood with reference to step 301" in the embodiment corresponding to FIG. 3. Details are not described herein again.

404: The participant B sends a part of U3 to the participant A1.

404': The participant B sends the other part of U3 to the participant A2.

Step 404 and step 404' can be understood with reference to step 302 and step 302' in the embodiment corresponding to FIG. 3. Details are not described herein again.

405: The participant A1 obtains a gradient G1 based on U1, the received U3, and the local data of A1.

Because it is expected that an output of a model is as close as possible to a value really expected to be predicted, a predicted value of the current model may be compared with the really desired target value, and then a weight vector of each layer of neural network is updated based on a difference between the two values. For example, if the predicted value of the model is high, the weight vector is adjusted to make the predicted value lower, and the weight vector is continuously adjusted until the really desired target value can be predicted for the model. Therefore, "how to obtain, through comparison, a difference between a predicted value and a target value" needs to be predefined. In this case, a loss function or an objective function needs to be used. The loss function and the objective function are important equations used to measure a difference between a predicted value and a target value. The loss function is used as an example. A higher output value (loss) of the loss function indicates a larger difference. Then, model training becomes a process of reducing the loss as much as possible. A gradient is a variation of a model parameter in a model training process, and can reflect a change trend of a loss value.

A predicted value of the model maintained by the participant A1 may be determined by using an operation between UA and U3 that is received by the participant A1, a value really expected to be predicted is determined based on the local data of A1, and the gradient G1 is determined based on a difference between the two values.

405': The participant A2 obtains a gradient G2 based on U2, the received U3, and the local data of A2.

A predicted value of the model maintained by the participant A2 may be determined by using an operation between UA and U3 that is received by the participant A2, a value really expected to be predicted is determined based on the local data of A2, and the gradient G2 is determined based on a difference between the two values. 405": The participant B obtains a gradient G3 based on U1, U2, U3, and the local data of B.

A predicted value of the model maintained by the participant B may be determined based on U1, U2, and U3, a value really expected to be predicted is determined based on the local data of B, and the gradient G3 is determined based on a difference between the two values.

406: The participant A1 updates the model WA1 based on G1.

406': The participant A2 updates the model WA2 based on G2.

406": The participant B updates the model WB based on G3.

407: The participant A1 determines whether an iterative training condition is satisfied.

There may be a plurality of iterative training conditions in this embodiment of this disclosure. This is not limited in embodiments of this disclosure.

In a possible implementation, when the participant A1 learns that a currently maintained model has been converged, it is determined that a condition for stopping iterative training is satisfied, and iterative training is no longer performed on the model maintained by the participant A1. In a possible implementation, when the participant A1 learns that a quantity of rounds of iterative training has reached a preset quantity of times, it is determined that a condition for stopping iterative training is satisfied, and iterative training is no longer performed on the model maintained by the participant A1.

In a possible implementation, if the participant A1 learns that the iterative training condition is not satisfied, the participant A1 continues to perform iterative training on the maintained model. In the solution provided in this embodiment of this disclosure, when the participant A1 learns that the iterative training condition is not satisfied, step 402 to step 407 are performed again. It should be noted that, correspondingly, in an iterative training process, the initialized parameter WA1 has been updated, and in steps related to the initialized parameter WA1 in step 402 to step 407, WA1 needs to be replaced with a parameter of the model currently maintained by the participant A1. Details are not described in the following again. For example, step 402 is correspondingly changed as follows: Obtain the intermediate result U1 based on the parameter of the model currently maintained by the participant A1 and the local data of the participant A1. Step 406 is correspondingly changed as follows: Update, based on G1, the parameter of the model currently maintained by the participant A1.

407': The participant A2 determines whether the iterative training condition is satisfied.

The iterative training condition can be understood with reference to the description of determining, by A1, whether the iterative training condition is satisfied in step 407.

In a possible implementation, if the participant A2 learns that the iterative training condition is satisfied, iterative training performed on the model maintained by the participant A2 is stopped.

In a possible implementation, if the participant A2 learns that the iterative training condition is not satisfied, step 402' to step 407' are performed again. It should be noted that, correspondingly, in the iterative training process, the initialized parameter WA2 has been updated, and in steps related to the initialized parameter WA2 in step 402' to step 407', WA2 needs to be replaced with a parameter of a model currently maintained by the participant A2. Details are not described in the following again. For example, step 402' is correspondingly changed as follows: Obtain the intermediate result U2 based on the parameter of the model currently maintained by the participant A2 and the local data of the participant A2. Step 406' is correspondingly changed as follows: Update, based on G2, the parameter of the model currently maintained by the participant A2.

407": The participant B determines whether the iterative training condition is satisfied.

The iterative training condition can be understood with reference to the description of determining, by A1, whether the iterative training condition is satisfied in step 407.

In a possible implementation, if the participant B learns that the iterative training condition is satisfied, iterative training performed on the model maintained by the participant A2 is stopped.

In a possible implementation, if the participant B learns that the iterative training condition is not satisfied, step 402" to step 407" are performed again. It should be noted that, correspondingly, in the iterative training process, the initialized parameter WB has been updated and the parameters of the models maintained by the participant A1 and the participant A2 have also been updated, and in steps related to the initialized parameters WB, WA1, and WA2 in step 402" to step 407", computation needs to be performed by correspondingly replacing WB, WA1, and WA2 with current parameters of the models maintained by the participants. Details are not described in the following again. For example, step 402" is correspondingly changed as follows: Obtain the intermediate result U3 based on a parameter of a model currently maintained by the participant B and the local data of the participant B. Step 406" is correspondingly changed as follows: Update, based on G2, the parameter of the model currently maintained by the participant B.

It should be noted that in some implementations, a sequence of the steps described in this embodiment of this disclosure may be changed or may be synchronously performed. Details are not described in the following embodiments.

In the architectures shown in the foregoing figures, participants participating in the federated training may be classified into two types: type-A participants and type-B participants. There may be a plurality of type-A participants and type-B participants (for case of description, in the foregoing figures, there is only one type-B participant participating in the model training). Data of different participants A1-AN belonging to a same type (for example, a type A) of participant has same feature space but different sample space. Data of different types of participants (for example, the type-A participants and the type-B participants) has different feature space but a same data identifier ID (that is, the party A and the party B has different features and same sample space for a same data sample). In this embodiment of this disclosure, the data ID is sometimes referred to as a sample ID, and the two names have a same meaning.

Figure 5:
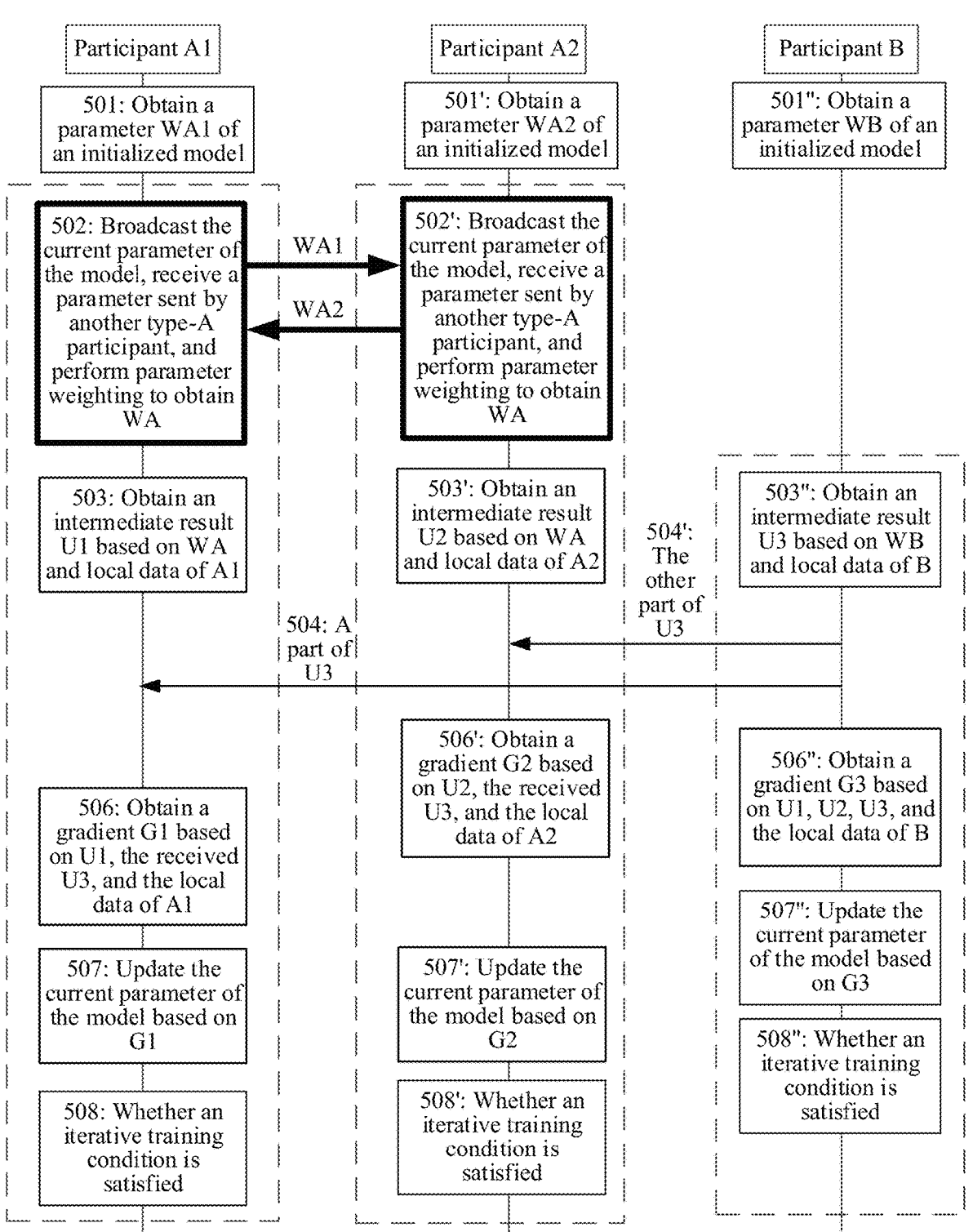
FIG. 5 is a schematic flowchart of another machine learning model update method according to an embodiment of this disclosure.

To improve model training efficiency, parameters of models maintained by the type-A participants may be further processed in a unified manner. With reference to FIG. 5, the following provides descriptions by using a specific embodiment.

501: A participant A1 obtains a parameter WA1 of an initialized model.

501': A participant A2 obtains a parameter WA2 of an initialized model.

501": A participant B obtains a parameter WB of an initialized model.

Step 501 to step 501" can be understood with reference to step 401 to step 401" in the embodiment corresponding to FIG. 4. Details are not described herein again.

502: The participant A1 broadcasts the current parameter of the model, receives a parameter sent by another type-A participant, and performs parameter weighting to obtain WA.

If the current parameter of the model maintained by the participant A1 is WA1, the participant A1 broadcasts WA1 to the another type-A participant. In addition, the participant A1 also receives a current parameter that is of a model maintained by the another type-A participant and that is broadcast by the another type-A participant. For example, the participant A1 also receives the current parameter that is of the model maintained by the participant A2 and that is broadcast by the participant A2. For example, if the current parameter of the model maintained by the participant A2 is W2, the participant A1 receives the parameter W2 broadcast by the participant A2.

The participant A1 performs weighted processing on the obtained current parameters of the models maintained by all the type-A participants, to obtain WA.

In a possible implementation, the participant A1 computes an average value of the obtained current parameters of the models maintained by all the type-A participants, where average value is WA.

In a possible implementation, the participant A1 may perform summation processing on the obtained current parameters of the models maintained by all the type-A participants, where a sum of the two current parameters is a first weighted value.

In a possible implementation, weights of the current parameters of the models maintained by all the type-A participants may be obtained based on quantities of training samples of the model maintained by all the type-A participants. A quantity of training samples is in direct proportion to a weight. For example, if a quantity of training samples of the participant A1 is greater than a quantity of training samples of the participant A2, a weight of the current parameter of the model maintained by the participant A1 is greater than a weight of the current parameter of the model maintained by the participant A2. If a quantity of training samples of the participant A1 is less than a quantity of training samples of the participant A2, a weight of the current parameter of the model maintained by the participant A1 is less than a weight of the current parameter of the model maintained by the participant A2.

502': The participant A2 broadcasts the current parameter of the model, receives a parameter sent by another type-A participant, and performs parameter weighting to obtain WA.

Step 502' can be understood with reference to the process performed by the participant A1 in step 502. Details are not described herein again.

503: The participant A1 obtains an intermediate result U1 based on WA and local data of A1.

In the embodiment corresponding to FIG. 4, the participant A1 obtains the intermediate result U1 based on WA1 and the local data of A1, and all the type-A participants obtain intermediate results based on respective parameters. In an initial status of each iterative training, the parameters of the models maintained by the type-A participants are different. Therefore, for the entire federated system, a plurality of parameters need to be optimized, and a large amount of computility is consumed. In contrast, in the embodiment corresponding to FIG. 5, the parameter of the model maintained by the participant A1 is replaced with WA. In an initial status of each iterative training, the parameters of the models maintained by the type-A participants are the same. Therefore, for the entire federated system, a quantity of parameters that need to be optimized is greatly reduced. This reduces needed computility, and is conducive to improving training efficiency.

A process of obtaining the intermediate result U1 based on the parameter of the model maintained by the participant A1 and the local data of the participant A1 can be understood with reference to step 402 in the embodiment corresponding to FIG. 4. Details are not described herein again.

503': The participant A2 obtains an intermediate result U2 based on WA and local data of A2.

Similar to the process performed in step 503, in an initial status of each iterative training, the participant A2 replaces the parameter of the model maintained by the participant A2 with WA, to ensure that the parameters of the models maintained by the type-A participants are the same. This reduces needed computility, and is conducive to improving training efficiency.

A process of obtaining the intermediate result U2 based on the parameter of the model maintained by the participant A2 and the local data of the participant A2 can be understood with reference to step 402' in the embodiment corresponding to FIG. 4. Details are not described herein again.

503": The participant B obtains an intermediate result U3 based on WB and local data of B.

504: The participant B sends a part of U3 to the participant A1.

504': The participant B sends the other part of U3 to the participant A2.

506: The participant A1 obtains a gradient G1 based on U1, the received U3, and the local data of A1.

506': The participant A2 obtains a gradient G2 based on U2, the received U3, and the local data of A2.

506": The participant B obtains a gradient G3 based on U1, U2, U3, and the local data of B.

507: The participant A1 updates the current parameter of the model based on G1.

507': The participant A2 updates the current parameter of the model based on G2.

507": The participant B updates the current parameter of the model based on G3.

508: The participant A1 determines whether an iterative training condition is satisfied.

508': The participant A2 determines whether the iterative training condition is satisfied. 508": The participant B determines whether the iterative training condition is satisfied.

Step 503" to step 508" can be understood with reference to step 402" to step 407" in the embodiment corresponding to FIG. 4. Details are not described herein again.

In the embodiment corresponding to FIG. 5, each type-A participant broadcasts the parameter of the model maintained by the type-A participant, so that each type-A participant can obtain a parameter of a model maintained by another type-A participant, and obtain WA. In some possible implementations, alternatively, each type-A participant may directionally send the parameter of the model maintained by the type-A participant to a device (for example, a type-A participant or another device). After obtaining the parameter of the model maintained by each type-A participant, the device performs weighted processing to obtain WA, and then broadcasts WA to each type-A participant.

In a possible implementation, when the type-A participants satisfy the iterative training condition, step 502 and step 502' may be further repeatedly performed once, and models obtained after step 502 and step 502' are performed are determined as final trained models. For example, when learning that the participant A1 satisfies the iterative training condition, the participant A1 learns that the another type-A participant also satisfies the iterative training condition. In this case, the participant A1 broadcasts the current parameter of the model, receives a parameter sent by the another type-A participant, performs parameter weighted processing to obtain WA, and then updates, by using WA, the current parameter of the model maintained by the participant A1, to obtain a final model. After the training ends, the parameters of the models maintained by the type-A participants are the same.

Figure 6A:
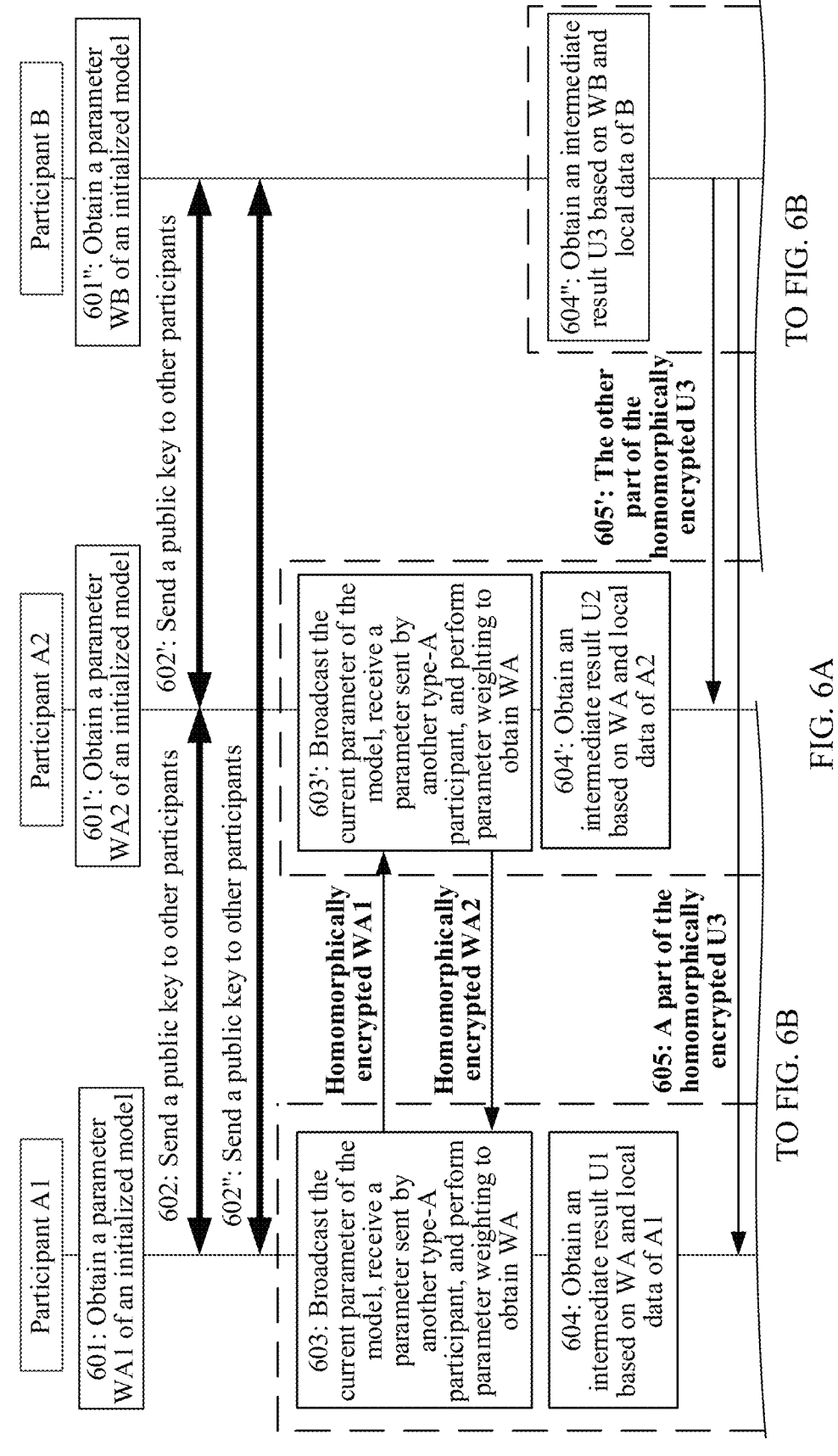

In some possible implementations, to maintain data privacy of each participant, encryption processing may be further performed on data to be sent by each participant. With reference to FIG. 6A and FIG. 6B, the following provides descriptions by using a specific implementation.

601: A participant A1 obtains a parameter WA1 of an initialized model.

601': A participant A2 obtains a parameter WA2 of an initialized model.

601": A participant B obtains a parameter WB of an initialized model.

Step 601 to step 601" can be understood with reference to step 401 to step 401" in the embodiment corresponding to FIG. 4. Details are not described herein again.

602 to 602": Each participant in a system sends a public key of the participant to other participants.

In the embodiment corresponding to FIG. 6A and FIG. 6B, each participant in the system generates the public key and a private key, and sends the generated public key to the other participants in the system.

For example, in the architecture shown in FIG. 6A and FIG. 6B, it is assumed that the participant A1 generates a first public key and a first private key, and sends the first public key to the participant A2 and the participant B. The participant A2 generates a second public key and a second private key, and sends the second public key to the participant A1 and the participant B. The participant B generates a third public key and a third private key, and sends the third public key to the participant A1 and the participant A2.

A public key described in this embodiment of this disclosure is a key used for encryption during homomorphic encryption, and a private key is a key used for decryption during the homomorphic encryption. Homomorphic encryption is an encryption form, and allows people to perform an algebraic operation in a specific form on ciphertext to still obtain an encryption result. A result obtained after a key in a homomorphic key pair is used to decrypt a result obtained by performing an operation on homomorphically encrypted data is the same as a result obtained by performing the same operation on plaintext.

603: The participant A1 broadcasts the current parameter of the model, receives a parameter sent by another type-A participant, and performs parameter weighting to obtain WA. In the embodiment corresponding to FIG. 6A and FIG. 6B, the participant A1 performs, by using the public key generated by the participant A1, homomorphic encryption on the current parameter of the model maintained by the participant A1. The participant A1 broadcasts the homomorphically encrypted current parameter of the model.

The participant A1 receives the homomorphically encrypted parameter sent by the another type-A participant. A result obtained after a key in a homomorphic key pair is used to decrypt a result obtained by performing an operation on homomorphically encrypted data is the same as a result obtained by performing a same operation on plaintext. Therefore, that the participant A1 performs weighted processing on the received homomorphically encrypted parameters to obtain WA is not affected.

A process of updating, by using the parameter WA, the current parameter of the model maintained by the participant A1 and performing weighted processing by using the homomorphically encrypted parameters can be understood with reference to the process of obtaining WA described in step 502 in the embodiment corresponding to FIG. 5. Details are not described herein again.

603': The participant A2 broadcasts the current parameter of the model, receives a parameter sent by another type-A participant, and performs parameter weighting to obtain WA.

Step 603' can be understood with reference to the process performed by the participant A1 in step 603. Details are not described herein again.

604: The participant A1 obtains an intermediate result U1 based on WA and local data of A1.

Because WA is obtained by using the homomorphically encrypted data, WA is considered as homomorphically encrypted data. Specifically, step 604 can be understood with reference to step 402 in the embodiment corresponding to FIG. 4. Details are not described herein again.

The participant A1 performs homomorphic encryption on the intermediate result U1 by using the public key generated by the participant A1, and sends the homomorphically encrypted U1 to the participants.

604': The participant A2 obtains an intermediate result U2 based on WA and local data of A2.

Because WA is obtained by using the homomorphically encrypted data, WA is considered as homomorphically encrypted data. Specifically, step 604' can be understood with reference to step 402' in the embodiment corresponding to FIG. 4. Details are not described herein again.

The participant A2 performs homomorphic encryption on the intermediate result U2 by using the public key generated by the participant A2, and sends the homomorphically encrypted U2 to the participants.

604": The participant B obtains an intermediate result U3 based on WB and local data of B.

Step 604" can be understood with reference to step 402" in the embodiment corresponding to FIG. 4. Details are not described herein again.

605: The participant B sends a part of the homomorphically encrypted U3 to the participant A1.

The participant B performs homomorphic encryption on UA by using the public key generated by the participant B, and the participant B performs homomorphic encryption on U3 by using the public key generated by the participant B.

605': The participant B sends the other part of the homomorphically encrypted U3 to the participant A2.

607: The participant A1 obtains a gradient G1 based on U1, the received U3, and the local data of A1.

607': The participant A2 obtains a gradient G2 based on U2, the received U3, and the local data of A2.

607": The participant B obtains a gradient G3 based on U1, U2, U3, and the local data of B.

608: The participant A1 updates the current parameter of the model based on G1.

608': The participant A2 updates the current parameter of the model based on G2.

608": The participant B updates the current parameter of the model based on G3.

609: The participant A1 determines whether an iterative training condition is satisfied.

610': The participant A2 determines whether the iterative training condition is satisfied.

611": The participant B determines whether the iterative training condition is satisfied.

A result obtained after a key in a homomorphic key pair is used to decrypt a result obtained by performing an operation on homomorphically encrypted data is the same as a result obtained by performing a same operation on plaintext. Therefore, a process in which each participant obtains the gradient and updates the model of the participant based on the gradient is not affected. In this case, step 607 to step 611" can be understood with reference to step 405 to step 407" in the embodiment corresponding to FIG. 4. Details are not described herein again.

It should be noted that in this embodiment of this disclosure, more or fewer steps may be included. For example, in the embodiment described in FIG. 6A and FIG. 6B, step 603 and step 603' may not be performed, and when each participant is in an initial status of each iterative training, the parameters of the models maintained by the type-A participants are different.

In the implementation described in FIG. 6A and FIG. 6B, each participant in the system generates the public key and the private key, and does not rely on a third party to generate the public key and the private key. Compared with a solution in which a third party generates a public key and a private key, this solution is simpler and has better privacy. It should be noted that in some possible implementations, alternatively, a third party generates a public key and a private key, and each participant in the system encrypts, by using the public key generated by the third party, data that needs to be sent.

In addition, in the implementation described in FIG. 6A and FIG. 6B, each participant in the system generates the public key and the private key, and performs, by using the public key generated by each participant, homomorphic encryption on data to be sent by the participant. In some possible implementations, a distributed public key may be generated by using public keys generated by a plurality of participants in the system, and homomorphic encryption may be performed, by using the distributed public key, on data to be sent by each participant. In some possible implementations, a distributed public key may be generated by using public keys generated by all participants in the system, and homomorphic encryption may be performed, by using the distributed public key, on data to be sent by each participant. In some possible implementations, private keys whose quantity is greater than a target quantity may be further set to decrypt homomorphically encrypted data. The target quantity may be set based on a quantity of currently online devices in the system. As data of the online device in the system changes, the target quantity may be reset. After the private keys whose quantity is greater than the target quantity is set to decrypt homomorphically encrypted data, if a quantity of offline participants in the system is excessively large, a quantity of private keys in the system used to decrypt homomorphically encrypted data may be insufficient. With reference to FIG. 7, the following describes how to deal with this offline scenario by using a specific implementation.

701: A device participating in federated training learns whether a quantity of online devices is less than a threshold.

The device participating in the federated training may be any participant in the systems described in the foregoing embodiments, or may be any participant in another type of federated learning system other than that in the foregoing embodiments. For example, the device may be the participant A or the participant B in the architecture described in FIG. 1 or FIG. 2.

The threshold may be set based on a total quantity of devices actually included in a system and an actual scenario requirement. The threshold needs to be not less than a target quantity. When a quantity of offline devices in the system is excessively large, a sufficient quantity (the target quantity) of private keys cannot be provided in the system to decrypt homomorphically encrypted data. Before this, the device participating in the federated training learns whether the quantity of online devices is less than the threshold, to learn in advance whether a sufficient quantity of private keys can be provided in the system to decrypt homomorphically encrypted data.

702: If the quantity of online devices is less than the threshold, send, to other online devices in the federated learning system in which the device is located, a homomorphically encrypted current parameter of a model maintained by the device.

If it is learned that the quantity of online devices is less than the threshold, it indicates that most devices in the system are offline, and a sufficient quantity of private keys cannot be provided in the system to decrypt homomorphically encrypted data. Therefore, in the solution provided in this disclosure, the device participating in the federated training needs to obtain decrypted data in advance, and the online device may decrypt the homomorphically encrypted parameter by using a private key of the online device.

703: Regenerate a distributed public key by using a public key of the online device in the system, and perform, based on the newly generated distributed public key, homomorphic encryption on the current parameter of the model maintained by the device.

In a subsequent training process, because the participants in the system further interact with each other, each online device may locally store, in a secret sharing manner (also referred to as a homomorphic encryption-to-secret sharing manner), the data obtained through decryption by using the private key of the online device. In a subsequent interaction process, a participant A1 obtains a decrypted parameter.

After obtaining the decrypted parameter, the participant A1 performs homomorphic encryption on the decrypted parameter again by using the regenerated shared public key. The regenerated distributed public key is generated by using the public key generated by the currently online device in the system. Because the quantity of currently online devices in the system is reduced, the target quantity is set to a smaller value, and the threshold is not less than the target quantity and is also set to a smaller value.

In a possible implementation, after decrypting the homomorphically encrypted parameter by using the private key of the online device, the online device may further send, to the device participating in the federated training, the data obtained through decryption by using the private key of the online device.

It should be noted that in some implementations, the implementations described in embodiments of this disclosure may be combined. For example, the implementation described in FIG. 7 may be combined with the embodiment described in FIG. 6A and FIG. 6B. For details, refer to the procedure shown in FIG. 8A and FIG. 8B.

801: A participant A1 obtains a parameter WA1 of an initialized model.

802: The participant A1 performs homomorphic encryption on the current parameter of the model by using a distributed public key.

803: The participant A1 broadcasts the homomorphically encrypted current parameter of the model.

804: The participant A1 receives a homomorphically encrypted parameter of a model of another type-A participant.

805: The participant A1 performs weighting on the obtained parameters to obtain WA.

806: The participant A1 obtains an intermediate result U1 based on WA and local data of A1.

807: The participant A1 sends a homomorphically encrypted U1 to a participant B.

808: The participant A1 receives a homomorphically encrypted UA and a homomorphically encrypted U3.

809: The participant A1 obtains a gradient G1 based on UA, U3, and the local data of A1.

810: The participant A1 updates the current parameter of the model based on the gradient G1.

811: The participant A1 determines whether an iterative training condition is satisfied.

Step 801 to step 811 can be understood with reference to the steps performed by the participant A1 in the embodiment corresponding to FIG. 6A and FIG. 6B. Details are not described herein again.

812: The participant A1 learns whether a quantity of online devices is less than a threshold.

The threshold may be set based on a total quantity of devices actually included in a system and an actual scenario requirement. The threshold needs to be not less than a target quantity. When a quantity of offline devices in the system is excessively large, a sufficient quantity (the target quantity) of private keys cannot be provided in the system to decrypt homomorphically encrypted data. Before this, the participant A1 learns whether the quantity of online devices is less than the threshold, to learn in advance whether a sufficient quantity of private keys can be provided in the system to decrypt homomorphically encrypted data.

If the participant A1 learns that the quantity of online devices is not less than the threshold, step 803 is performed, that is, an iterative training process is normally performed.

If the participant A1 learns that the quantity of online devices is not less than the threshold, it indicates that most devices in the system are online, and a sufficient quantity of private keys can be provided in the system to decrypt homomorphically encrypted data. In this case, the iterative training process is normally performed. Specifically, step 803 to step 811 are performed. In a possible implementation, when the participant A1 learns that the iterative training condition is satisfied, the iterative training process is no longer performed. The participant A1 may learn again whether the quantity of online devices is less than the threshold. If the quantity of online devices is not less than the threshold, it is considered that the training is completed.

If the participant A1 learns that the quantity of online devices is less than the threshold, steps 813 to 815 are performed. The following provides descriptions.

If the participant A1 learns that the quantity of online devices is less than the threshold, it indicates that most devices in the system are offline, and a sufficient quantity of private keys cannot be provided in the system to decrypt homomorphically encrypted data. Therefore, in the solution provided in this disclosure, the participant A1 needs to obtain decrypted data in advance, regenerate a new distributed public key by using a public key generated by the currently online device, and perform homomorphic encryption again on the data by using the newly generated distributed public key.

In a possible implementation, if the participant A1 learns that the quantity of online devices is less than the threshold, steps 813 and 813' are performed. The participant A1 sends, to the currently online device in the system, the homomorphically encrypted current parameter of the model maintained by the participant A1, and the online device may decrypt the homomorphically encrypted parameter by using a private key of the online device. In this case, the homomorphically encrypted data is data obtained through homomorphic encryption by using the distributed public key, and private keys whose quantity is greater than the target quantity need to decrypt the homomorphically encrypted data. Because the participant A1 learns that the quantity of online devices is less than the threshold and the threshold is not less than the target quantity, a quantity of private keys in the system used to decrypt homomorphically encrypted data is sufficient, to obtain decrypted data.

In a possible implementation, the online device may send the data obtained through decryption by using the private key of the online device to the participant A1, so that the participant A1 obtains a decrypted parameter after combining the data sent by the online device.

After obtaining the decrypted parameter, the participant A1 performs homomorphic encryption on the decrypted parameter again by using the regenerated distributed public key. The regenerated distributed public key is generated by using the public key generated by the currently online device in the system. Because the quantity of currently online devices in the system is reduced, the target quantity is set to a smaller value, and the threshold is not less than the target quantity and is also set to a smaller value.

In a possible implementation, in a subsequent iterative training process, because the participants in the system further interact with each other, the online device may alternatively not send the data obtained through decryption by using the private key of the online device to the participant A1. Each online device locally stores, in a secret sharing manner, the data obtained through decryption by using the private key of the online device. In a subsequent interaction process, the participant A1 obtains the decrypted parameter. Specifically, in a possible implementation, if the participant A1 learns that the quantity of online devices is less than the threshold, the participant A1 sends, to the currently online device in the system, the homomorphically encrypted current parameter of the model maintained by the participant A1. After receiving the homomorphically encrypted current parameter of the model sent by A1, the online device locally and randomly generates a random initialized model that has a same structure as the model parameter, subtracts a parameter of the random initialized model locally and randomly generated from the homomorphically encrypted parameter of the model sent by the party A1, locally retains the random initialized model of the online device as a secret sharing model of the AI model in the online device, and decrypts a model parameter obtained through subtraction by using the private key of the online device. The online device sends the data obtained through decryption by using the private key of the online device (a model that is obtained by subtracting the randomly generated secret sharing model in the online device from a ciphertext model and that is still in a homomorphically encrypted state) to the participant A1, so that the participant A1 obtains the secret sharing model of the original model of the participant A1 after combining the data sent by the online device. In the subsequent iterative training process, because the participants in the system further interact with each other, homomorphic encryption is then performed on a secret sharing model of each online device by using the newly generated distributed public key, and aggregation (summation) is performed to complete model transformation.

Processes in which the type-A participants learn that the quantity of online devices in the system is less than the threshold and the quantity of online devices is not less than the threshold can be understood with reference to the process performed by the participant A1. Details are not described herein again.

Before learning whether the iterative training condition is satisfied or after updating the current parameter of the model based on the gradient, the type-B participants may learn whether the quantity of online devices is less than the threshold. When the quantity of online devices is less than the threshold, the iterative training process is normally performed. When the quantity of online devices is not less than the threshold, a homomorphically encrypted current parameter of a model maintained by the participant B is sent to the online device. The online device may decrypt the homomorphically encrypted parameter by using the private key of the online device. Specific content can be understood with reference to steps 812 to 815 performed by the participant A1. Details are not described herein again.

Figure 9:
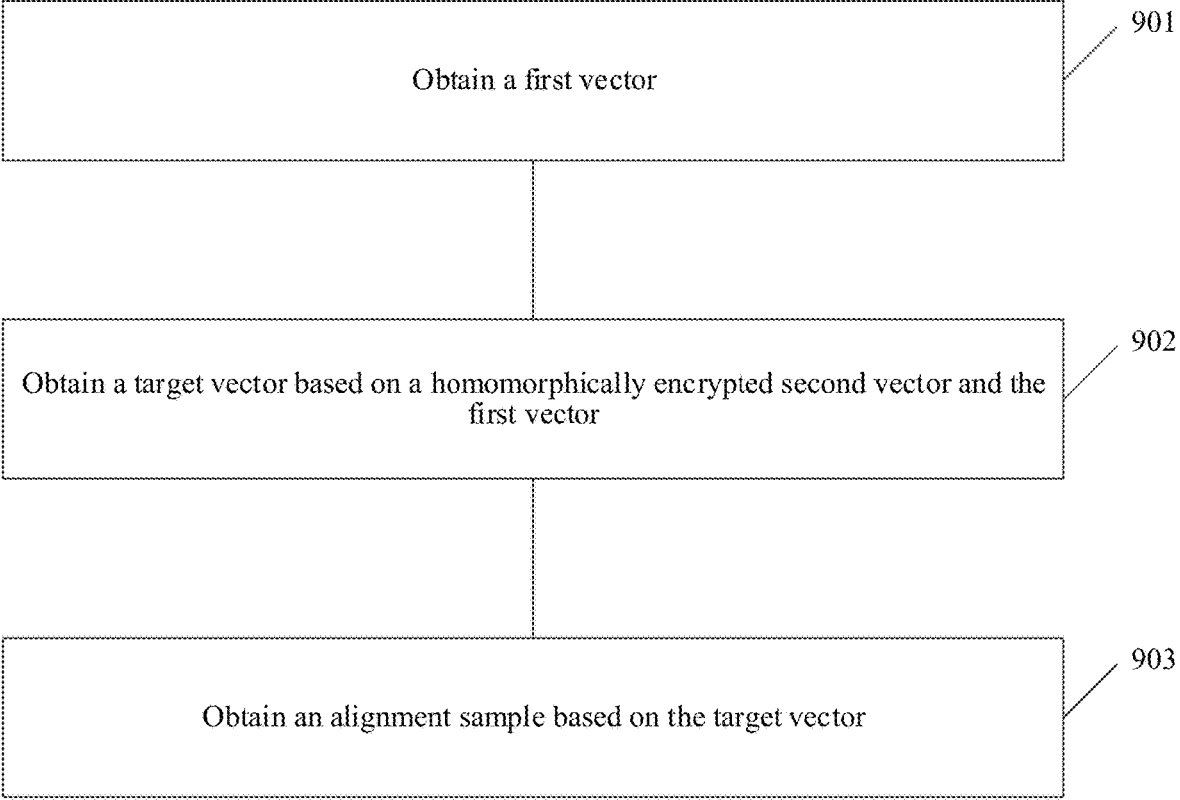
FIG. 9 is a schematic flowchart of a method for obtaining alignment samples according to an embodiment of this disclosure.

As described in the foregoing embodiments, in the vertical federated learning system, user groups of the plurality of participants are different, and alignment processing needs to be performed on data maintained by the plurality of parties, to ensure that sample space of training samples of the models maintained by the plurality of parties is the same. Generally, the plurality of parties participating in the vertical federation may find an intersection set of users between different participants in an encrypted-sample alignment manner, to perform collaborative modeling by using user data that has an intersection set (for a user that exists only in one party, data of the user does not exist in the plurality of parties at the same time, and therefore the plurality of parties cannot perform collaborative modeling by using the data of the user). If the encrypted-sample alignment manner is not used, when the plurality of parties send user identifier IDs (for example, mobile numbers of the users) owned by the plurality of parties in plaintext forms, a compliance problem exists, and customer group information owned by the plurality of parties is disclosed. This is unacceptable to some organizations participating in the federation. The existing encrypted-sample alignment solution ensures that a user set of the participants is not disclosed in a process of obtaining an intersection set of the data of the plurality of users. However, after the intersection set is obtained, cross-users of the plurality of users are obtained by other participants, and in a specific scenario, information about the cross-users is not expected to be disclosed to the participants. For this scenario, an embodiment provides a new encrypted-sample alignment solution to ensure that after the process of obtaining the intersection set of the data of the plurality of users ends, none of the parties participating in the federation can obtain the information about the cross-users of the plurality of users, but the parties can still perform model training based on a result of obtaining the intersection set. With reference to FIG. 9, the following provides descriptions by using a specific implementation.

901: A device participating in vertical federation obtains a first vector.

The solution provided in this embodiment of this disclosure may be applied to any two devices participating in the vertical federation, for example, may be applied to the participant A1 and the participant B described in the foregoing embodiments, or may be applied to the participant A2 and the participant B described in the foregoing embodiments.

The first vector has N dimensions, and the N dimensions are corresponding to identifier IDs of all samples in a system. For example, one dimension is corresponding to an ID of one sample. In a possible implementation, the device participating in the vertical federation may receive maximum IDs and minimum IDs that are of samples of other devices in the system in which the device participating in the vertical federation is located and that are sent by the other devices, and determine a value of N based on a maximum value of all the obtained maximum IDs and a minimum value of all the obtained minimum IDs.

A value of a first dimension of the first vector indicates whether an ID of a first target sample exists in a sample of a model maintained by the device participating in the vertical federation, and the first dimension is corresponding to the ID of the first target sample. In other words, a value of a dimension of the first vector indicates whether an ID of a sample corresponding to the dimension exists in the sample of the model maintained by the device participating in the vertical federation. For example, in a possible implementation, if the value of the first dimension is 0, it indicates that the ID of the first target sample does not exist in the sample of the model maintained by the device participating in the vertical federation; or if the value of the first dimension is 1, it indicates that the ID of the first target sample exists in the sample of the model maintained by the device participating in the vertical federation.

902: The device participating in the vertical federation obtains a target vector based on a homomorphically encrypted second vector and the first vector.

The second vector and the first vector have same dimensions, and there may be a plurality of second vectors.

A value of a first dimension of each second vector indicates whether the ID of the first target sample exists in a sample of a model maintained by a device in the other devices in the system in which the device participating in the vertical federation is located.

The device participating in the vertical federation may obtain the target vector based on all the obtained homomorphically encrypted second vectors and the obtained first vector, for example, may perform a multiplication operation on all the obtained homomorphically encrypted second vectors and the obtained first vector, to obtain the target vector.

903: The device participating in the vertical federation obtains an alignment sample based on the target vector.

The target vector has N dimensions, and a value of one of the N dimensions indicates whether an identifier of a sample corresponding to the dimension exists in an ID of a sample of each device in the system.

The device participating in the vertical federation may obtain the alignment samples based on the value of each dimension of the target vector.

In the embodiment corresponding to FIG. 9, the first vector is corresponding to the identifier IDs of all the samples in the system, to ensure that after the alignment samples are obtained, none of parties participating in the federation can obtain information about the alignment samples. In this way, data privacy of the participants participating in the federated training is protected, and model training can still be performed based on the alignment samples.

For better understanding of this solution, the following further provides descriptions with reference to a specific implementation.

First, each participant obtains a maximum ID and a minimum ID of samples in a self-owned dataset based on the dataset. The IDs may be identifiers such as phone numbers. Each participant broadcasts the maximum ID and the minimum ID of the participant to other participants. After receiving the IDs, each participant computes a maximum ID and a minimum ID among all the participants participating in the federation.

A participant User_X is used as an example to describe the following procedure.

A maximum ID and a minimum ID obtained through computation based on sample IDs of a self-owned dataset based on the sample IDs are User_X_ID_max and User_X_ID_min, respectively.

The self-owned maximum ID and minimum ID are broadcast to a plurality of parties participating in the federation. In a possible implementation, alternatively, a value of the maximum ID may be increased, and a value of the minimum ID may be decreased, to hide exact values of the sample IDs.

Maximum IDs and minimum IDs sent by the plurality of parties participating in the federation are received, and a maximum ID and a minimum ID obtained through computation among all the obtained IDs are ID_max and ID_min, respectively.

Then, each party generates a full identifier vector (for example, the first vector and the second vector in the embodiment corresponding to FIG. 9) based on ID_max and ID_min; fills, based on self-owned sample IDs, identifiers of locations corresponding to all the samples of the party in the full user identifier vector (for example, obtains a value of each dimension of the first vector or a value of each dimension of the second vector in the embodiment corresponding to FIG. 9); performs homomorphic encryption on an assigned full user identifier vector; and then broadcasts the homomorphically encrypted full user identifier vector to each participant participating in the federation.

In a possible implementation, a size of the full identifier vector is determined based on ID_max and ID_min, a first location of the vector represents a sample ID_min, and a last location of the vector represents ID_max. Alternatively, a first location of the vector represents a sample ID_max, and a last location of the vector represents ID_min. Locations between the first location and the last location represent locations corresponding to sample IDs located between the maximum ID and the minimum ID.

A participant User_X is used as an example to describe the following procedure.

Values of dimensions of an initial full identifier vector are all 0. Based on all the sample IDs of the participant User_X, assignment is performed on the self-owned full identifier vector, and locations of all the sample IDs of the User_X in all locations of the full identifier vector are set to 1.

The User_X performs homomorphic encryption on the assigned self-owned full identifier vector [[User_X]] by using a distributed public key, and broadcasts [[User_X]].

The User_X receives encrypted full identifier vectors broadcast by the other participants, and multiplies the self-owned [[User_X]] by the encrypted full identifier vectors sent by the other parties, to obtain a public encrypted full identifier vector [[User_ID_Set]] shared by all the participants.

Sample IDs that have an intersection set and that are of the plurality of users are obtained by using [[User_ID_Set]], and samples that have an intersection set are used as training samples. In a possible implementation, [[User_ID_Set]] may be alternatively decrypted. Each party extracts, as training data of models based on the decrypted User_ID_Set, samples in self-owned data that have an intersection set with samples of the other parties.

In the embodiment corresponding to FIG. 9, after obtaining the target vector, the device participating in the vertical federation obtains the alignment samples from all local samples based on the target vector, and uses the alignment samples as training samples.

The following describes the solution by using a specific example.

Figure 10A:
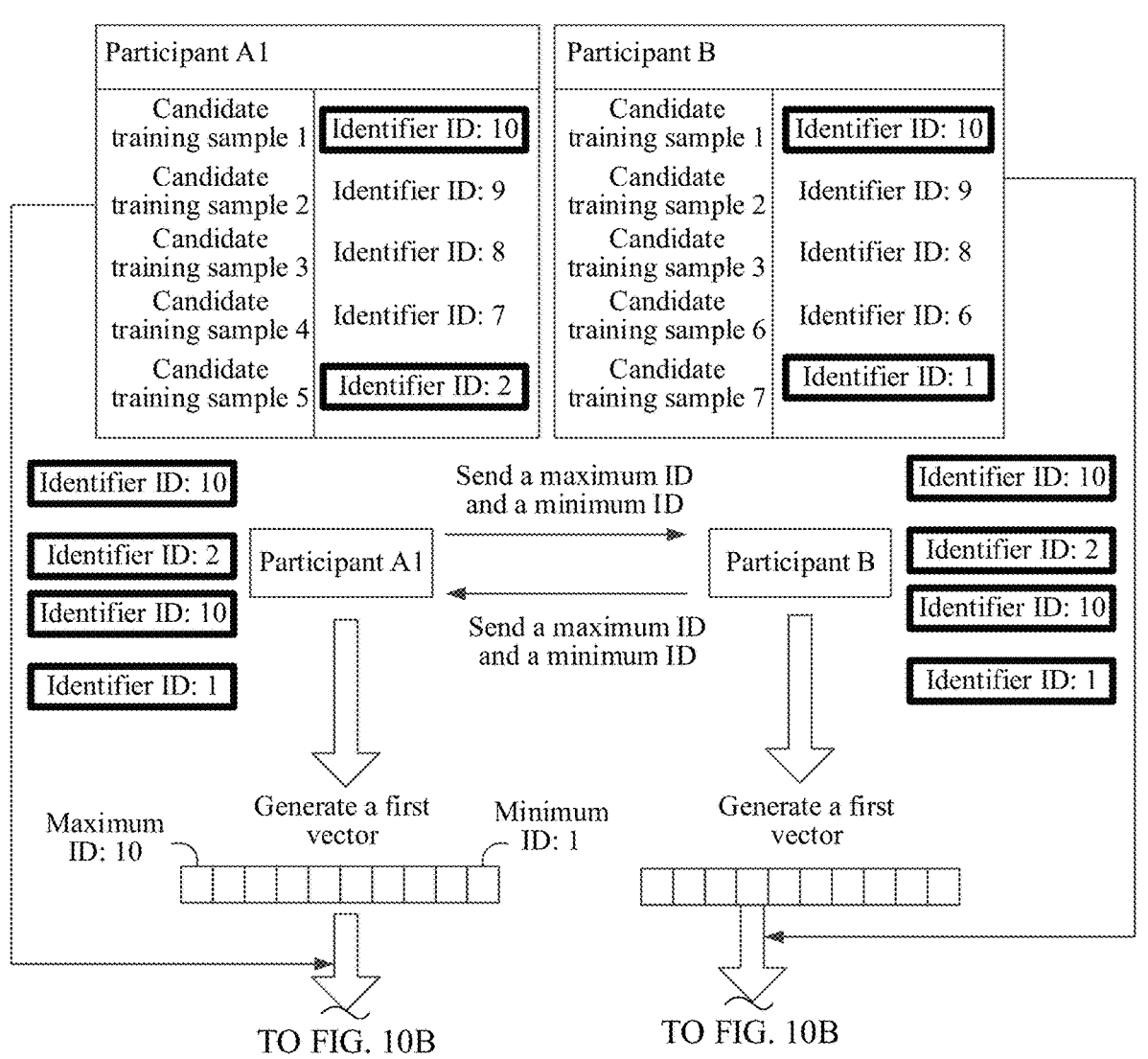
FIG. 10A and FIG. 10B are a schematic flowchart of a method for obtaining alignment samples according to an embodiment of this disclosure.
Figure 10B:
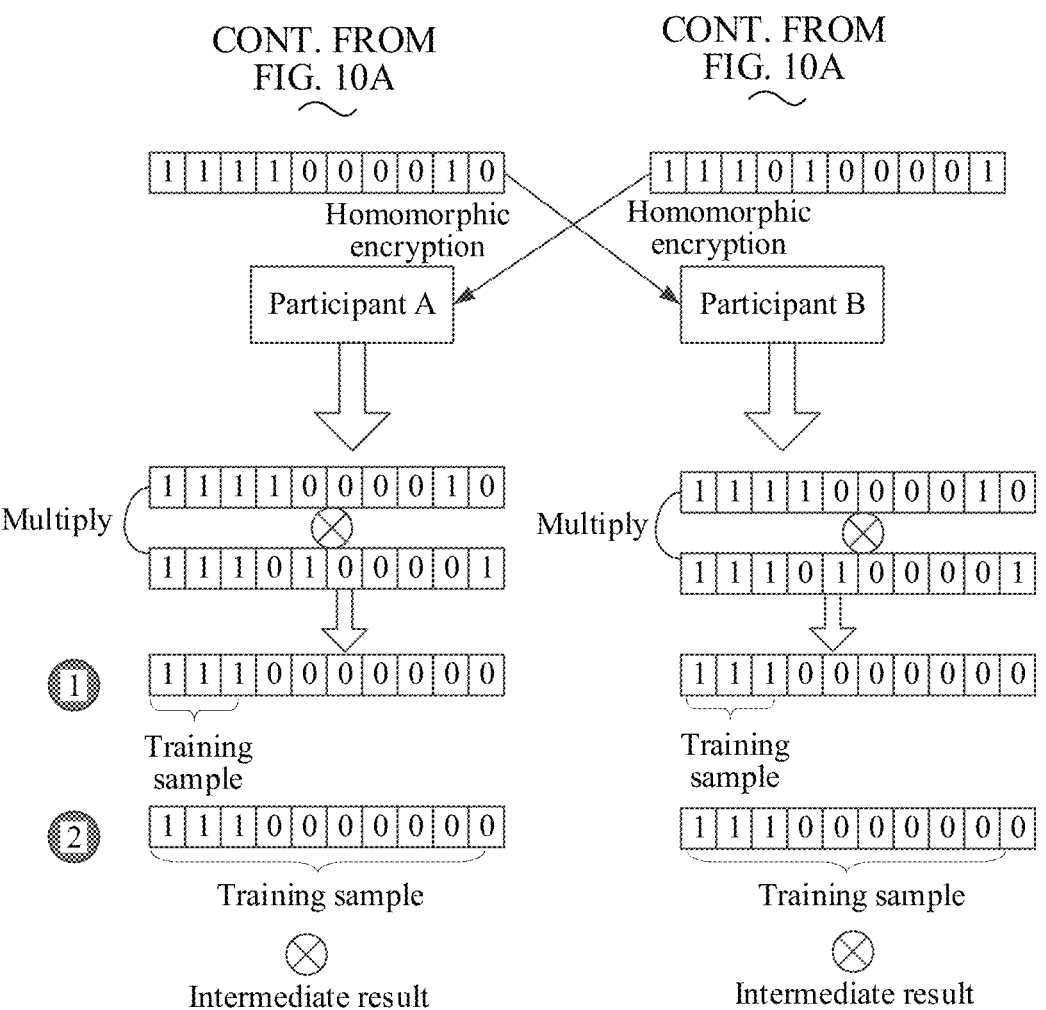

With reference to FIG. 10A and FIG. 10B, two participants are used as an example to describe the solution. It is assumed that participants participating in vertical federated training include a participant A1 and a participant B. In addition, it is assumed that samples of the participant A1 (or a self-owned dataset of the participant A1) include a candidate training sample 1, a candidate training sample 2, a candidate training sample 3, a candidate training sample 4, and a candidate training sample 5; and it is assumed that samples of the participant B (or a self-owned dataset of the participant B) include a candidate training sample 1, a candidate training sample 2, a candidate training sample 3, a candidate training sample 6, and a candidate training sample 7.

As shown in FIG. 10A and FIG. 10B, it is assumed that the participant A1 obtains a maximum sample ID 10 and a minimum sample ID 2 based on data included in the self-owned dataset, and the participant B obtains a maximum sample ID 10 and a minimum sample ID 1 based on data included in the self-owned dataset. The participant A1 and the participant B broadcast the respective maximum sample IDs and minimum IDs.

It is assumed that the participant A1 and the participant B obtain the maximum ID 10 and the minimum ID 1 among all sample IDs based on all the obtained sample IDs. The participant A1 is used as an example for further description. The participant A1 generates a full identifier vector based on the obtained maximum ID (10) and minimum ID (1), where the full identifier vector includes 10 dimensions in total. The participant A1 performs, based on IDs of the samples included in the self-owned dataset, assignment on the full identifier vector generated by the participant A1. For details, refer to an assignment result shown in FIG. 10A and FIG. 10B for understanding. The participant A1 performs homomorphic encryption on the assigned full identifier vector generated by the participant A1, and broadcasts the encrypted full identifier vector. A process performed by the participant B is similar to that performed by the participant A1, and can be understood specifically with reference to FIG. 10A and FIG. 10B. The participant A1 receives an encrypted full identifier vector that is generated by the participant B and sent by the participant B, and performs a multiplication operation on all the obtained encrypted full identifier vectors, to obtain a public encrypted full identifier vector shared by all the participants, which is also referred to as a target vector in this disclosure. The participant A1 then obtains alignment samples as training samples based on the target vector.

A manner of obtaining alignment samples (training samples) in the implementations described in FIG. 9 and FIG. 10A and FIG. 10B may be applied to obtaining of the alignment samples of the participant A1 and the participant B (the local data of A1 and the local data of B in the implementations described in FIG. 3 to FIG. 8A and FIG. 8B) or obtaining of the alignment samples of the participant A2 and the participant B (the local data of A2 and the local data of B in the implementations described in FIG. 3 to FIG. 8A and FIG. 8B) in the implementations described in FIG. 3 to FIG. 8A and FIG. 8B.

In a possible implementation, after obtaining the target vector, the device participating in the vertical federation may use all the local samples as the training samples. In a training process, after obtaining an intermediate result, the device participating in the vertical federation performs a multiplication operation on the intermediate result and the target vector, performs homomorphic encryption on a result obtained through the multiplication operation, and transmits, in the system, the homomorphically encrypted result obtained through the multiplication operation. For example, in the implementations described in FIG. 3 to FIG. 8A and FIG. 8B, the local data of A1 and the local data of B are no longer alignment samples, but are all samples of A1 and all samples of B, that is, the self-owned dataset of A1 and the self-owned dataset of B. The local data of A2 and the local data of B are no longer alignment samples, but are all samples of A2 and all samples of B, that is, a self-owned dataset of A2 and the self-owned dataset of B. In addition, in the implementations described in FIG. 3 to FIG. 8A and FIG. 8B, after obtaining the intermediate result, each participant performs a multiplication operation on the intermediate result and the target vector obtained by the participant. A result obtained through subsequent computation related to an intermediate result may be a homomorphically encrypted result by performing a multiplication operation on the target vector obtained by each participant and the intermediate result.

The following describes advantages of implementations of this disclosure more clearly by using Table 1.

TABLE 1

| Solution | Advantage |
|---|---|
| A parameter of a model maintained by a participant is broadcast to other participants of a same type as the participant, weighted processing is performed on obtained parameters of models of the participants of the same type, and the parameter of the model maintained by the participant is updated based on an obtained weighted value. For details, refer to each implementation for understanding. | When there are a plurality of type-A participants and type-B participants, each participant obtains a model based on a type to which the participant belongs. Models obtained by the participants of the same type are of a same structure, but parameters of the models are inconsistent. In this solution, the parameters of the models maintained by the participants of the same type are processed in a unified manner, to improve model training efficiency. |
| A participant obtains intermediate results based on training samples maintained by at least two other participants of a different type from the participant, and sends different intermediate results to the at least two participants, so that the at least two participants update, based on the obtained different intermediate results, parameters of models maintained by the at least two participants. The participant updates, based on intermediate results separately obtained and sent by the at least two participants and the intermediate results obtained by the participant, a parameter of a model maintained by the participant. For details, refer to each implementation for understanding. | Horizontal federated training and vertical federation are combined, and a feasible manner of combining horizontal federation and vertical federation is provided. |
| A participant generates a private key and a public key. The public key may be used to perform homomorphic encryption on data transmitted in a system, and the private key may be used to perform homomorphic decryption on the data transmitted in the system. For details, refer to each implementation for understanding. | A third party is not relied on to generate the public key and the private key. Compared with a solution in which a third party generates a public key and a private key, this solution is simpler and has better privacy. |
| A participant may generate a distributed public key by using public keys generated by all participants in a system, and perform, by using the distributed public key, homomorphic encryption on data to be sent by each participant; set private keys whose quantity is greater than a target quantity to decrypt homomorphically encrypted data; when learning that a quantity of online devices is not less than a threshold, send the encrypted parameter of the participant, so that other online participants perform decryption by using private keys of the other online participants; and use a regenerated private key to encrypt a decrypted parameter again. For details, refer to each implementation for understanding. | When the participant goes offline, a model training process does not need to be restarted, and a model parameter obtained in a previous training process can still be used for subsequent model training. |

TABLE 1-continued

| Solution | Advantage |
| --- | --- |
| A first vector is corresponding to identifier IDs of all samples in a system. A target vector is obtained based on first vectors of a plurality of participants, and alignment samples are obtained based on the target vector.<br><br>For details, refer to each implementation for understanding. | It is ensured that after the alignment samples are obtained, none of parties participating in federation can obtain information about the alignment samples. In this way, data privacy of the participants participating in the federated training is protected, and model training can still be performed based on the alignment samples. |

According to the solution provided in this embodiment of this disclosure, data in same feature space and different sample space and data in different feature space and same sample space can be simultaneously used as training samples to train a model. The solution provided in this embodiment of this disclosure can expand application scenarios of federated learning. For example, the following provides two possible application scenarios.

Scenario 1: A participant B is an e-commerce service provider, and has many users' click, favorites, and purchase record data on a website of the participant B. Type-A users are operator users. Different type-A users are different telecom operators such as China Mobile, China Telecom, China Unicom, and the like, and have communication information of many users such as package prices, call frequencies, and the like. In addition, type-B users and type-A users have cross-users (for example, users identified by a same mobile number). In this case, the party B can establish an AI model with the type-A users in a multi-party collaborative manner, to offer product recommendation to the type-B users.

Scenario 2: A participant B is an e-commerce service provider (for example, a device that stores e-commerce data), and has many users' click, favorites, and purchase record data on a website of the participant B. Type-A users are e-commerce website users (mobile phones of users, other terminal devices, and the like). A mobile phone of a user has behavior information of the user on the mobile phone, including a quantity of various apps, daily use time of the mobile phone, and other behavior information. After consent of the user is obtained, this type of information can be used to collaboratively establish a model with type-B e-commerce users, to offer product recommendation to the type-B users.

The solution is described herein by using an example with reference to the scenario 2 and a possible implementation.

First, e-commerce website users and e-commerce service providers generate public keys and private keys, and exchange the public keys with each other. To be specific, each e-commerce website user broadcasts the generated public key to other e-commerce website users and the e-commerce service providers, and each e-commerce service provider broadcasts the public key generated by the e-commerce service provider to all the e-commerce website users. The e-commerce website users and the e-commerce service providers synthesize a distributed public key based on the received public keys and the locally generated public keys, and perform homomorphic encryption on subsequently sent data (for example, intermediate results) by using the distributed public key.

Each e-commerce website user encrypts a model parameter of the e-commerce website user by using the distributed public key, and broadcasts the encrypted model parameter. Each e-commerce website user obtains a parameter of a public model by using the locally encrypted model parameter and the received encrypted model parameters, to obtain an intermediate result of the e-commerce website user by using the public model.

Each e-commerce website user generates an intermediate result in a ciphertext form by using the public model in a ciphertext form and local data of the e-commerce website user, and sends the intermediate result in a ciphertext form to the e-commerce service provider. The e-commerce service provider obtains the intermediate result by using a local model and local data.

The e-commerce service providers send the intermediate results obtained by the e-commerce service providers to the e-commerce website users. Intermediate results sent by the e-commerce service providers and received by the e-commerce website users are different. The users and the e-commerce service providers compute gradients by using the obtained intermediate results, and update respective models.

When a large quantity of users in e-commerce website users are offline, for example, when a quantity of offline users reaches a threshold, remaining online e-commerce website users convert respective models into secret share forms at the existing online users by using a distributed threshold homomorphic encryption-to-secret sharing technology. The currently online e-commerce website users generate a key by using a distributed threshold encryption technology, and convert the secret shares of models into homomorphically encrypted data based on the key by using a secret sharing-to-distributed threshold homomorphic encryption technology.

In the foregoing scenario 1 and scenario 2, a data type of a training sample of a model maintained by each participant included in a system may be considered as user data. The user data can be understood as data generated based on a user behavior (for example, data generated due to an operation behavior of a user on a device deployed by each participant, and specifically data generated due to a click behavior and a favorites behavior of a user on a website mentioned in the foregoing scenario 1), or can be understood as data that is related to a specific user and that is generated when a participant of the federated learning system provides a service for the user (for example, the package prices and the call frequencies mentioned in the foregoing scenario 1). For example, the following further provides examples of possible application scenarios when data types of two training samples are user data.

In a possible implementation, the participant B is an operator, and the operator maintains a plurality of types of network elements. Data obtained by each type of network element may form operator-side feature data in data of a training sample. There may be a plurality of participants B such as China Mobile, China Telecom, China Unicom, and the like. The participant A is an Internet company, and has data generated when a user uses an Internet service (for example, viewing a video or a web page). A service-flow service experience model may be collaboratively established by using data maintained by the participant A and the participant B, so that the participant B identifies service experience of a user of the participant B.

Table 2 is an example of a dataset of a training sample in the system in the foregoing scenario.

TABLE 2

| Row number | Data | Data source | Description |
| --- | --- | --- | --- |
| 1 | Service Experience | AF | Service-flow service experience |
| 2 | Buffer size | AF | Buffer size of an application layer corresponding to a service flow |
| 3 | [Private data type] | AF | Internal private data of the AF |
| 4 | QoS flow Bit Rate | UPF | Flow rate |
| 5 | QoS flow Packet Delay | UPF | Flow delay |
| 6 | QoS flow Packet Error Rate | UPF | Flow packet error rate |
| 7 | [Private data type] | UPF | Internal private data of the UPF |
| 8 | Reference Signal Received Power | RAN | Radio signal quality RSRP |
| 9 | Reference Signal Received Quality | RAN | Radio signal quality RSRQ |
| 10 | Signal to Interference plus Noise Ratio | RAN | Radio signal quality SINR |
| 12 | [Private data type] | RAN | Internal private data of the RAN |

Row numbers 1 to 3 are examples of data owned by the Internet company, and row numbers 4 to 12 are examples of data owned by the operator. The data corresponding to the row number 1 may be used as label data for model training, that is, user service experience is used as label data. The data in the rows 1 to 12 is data of a same user in a plurality of entities.

An application function (AF) entity is used to provide services or route application-related data. A user plane function (UPF) network element is responsible for forwarding and receiving user data in a terminal device. The UPF network element may receive user data from a data network (DN), and transmit the user data to the terminal device through an access network device. The UPF network element may further receive user data from the terminal device through the access network device, and forward the user data to the data network. The access network device may be a radio access network (RAN) node that connects the terminal device to a wireless network. Currently, for example, some RAN nodes are as follows: a next generation NodeB (gNB), a transmission and reception point (transmission reception point, TRP), an evolved NodeB (eNB), a radio network controller (radio network controller, RNC), a NodeB (NB), a base station controller (BSC), a base transceiver station (BTS), a home NodeB (for example, a home evolved NodeB or a home NodeB, HNB), a baseband unit (BBU), and a wireless fidelity (Wi-Fi) access point (AP). The base station may be in a plurality of forms, for example, a macro base station, a micro base station, a relay node, and an access point. The base station in embodiments of this disclosure may be a gNB in a 5G system, an eNodeB in an LTE system, or a future sixth generation (6G) base station in a future communication system. The gNB in the 5G system may also be referred to as a transmission reception point (TRP) or a next generation NodeB (gNB or gNodeB). For ease of description, the access network device is referred to as a RAN for short in embodiments of this disclosure.

In a possible implementation, the participant B is an operator, and has communication information of many users such as package prices, call frequencies, and the like. The participant A is a bank and has information such as user identity information and bank statements. In this case, the party B can establish an AI model with the type-A users in a multi-party collaborative manner, to provide loan suggestions for users of the participant A.

Table 3 is an example of a dataset of a training sample in the system in the foregoing scenario.

TABLE 3

| Row number | Data | Data source | Description |
| --- | --- | --- | --- |
| 1 | status | Banking service system | Whether a breach is committed? |
| 2 | age | Banking service system | Age |
| 3 | job | Banking service system | Occupation |
| 4 | Sex | Banking service system | Gender |
| 5 | operation | Banking service system | Quantity of times of receiving payments from other banks |
| 6 | balance | Banking service system | Savings account balance |
| 7 | amount | Banking service system | Amount consumed |
| 8 | Order_num | Banking service system | Quantity of consumption transactions |
| 9 | days | Banking service system | Quantity of days from a current date to a due date |
| 10 | arrears | Operator service system | Whether a phone charge is overdue? |
| 11 | CALL NUMS | Operator service system | Quantity of calls |
| 12 | Communication flows | Operator service system | Traffic consumed |
| 13 | Call nums vs last month | Operator service system | Change ratio of a quantity of calls to that in the last month |
| 14 | Communication_flows vs last month | Operator service system | Change ratio of consumed traffic to that in the last month |

The data whose row number is 1 (that is, the status) is used as label data for model training. The data corresponding to the row numbers 1 to 9 is data obtained by a banking service system server, and the data corresponding to the row numbers 10 to 14 is data obtained by the operator service system. The data whose row numbers are 1 to 14 is data of a same user in different participants (the participant A and the participant B in the example).

In addition, in some possible implementations, the training samples of the models maintained by the participants included in the system may be data in same feature space and different sample space. In some possible implementations, the training samples of the models maintained by the participants included in the system may be data in different feature space and same sample space. Specific implementations can be understood with reference to the foregoing embodiments. Details are not described herein again.

The foregoing describes a machine learning model update system and method that are provided in this disclosure. The solutions provided in embodiments of this disclosure can expand application scenarios of federated learning, making a prediction result of a trained model of each participant more accurate. It can be understood that, to implement the foregoing functions, the participants include corresponding hardware structures and/or software modules for performing the functions. A person skill in the art should be easily aware that, in combination with the modules and algorithm steps in the examples described in embodiments disclosed in this specification, this disclosure can be implemented by hardware or a combination of hardware and computer software. Whether a function is performed by hardware or by computer software driving hardware depends on particular applications and design constraints of the technical solutions. A person skilled in the art may use a different method to implement the described functions for each particular application, but it should not be considered that the implementation goes beyond the scope of this disclosure.

From a perspective of a hardware structure, the participant or the device in FIG. 3 to FIG. 10A and FIG. 10B may be implemented by one physical device, may be implemented jointly by a plurality of physical devices, or may be a logical functional module in one physical device. This is not specifically limited in embodiments of this disclosure. The following describes, based on the foregoing machine learning model update system and method, apparatuses provided in this disclosure. The apparatuses are configured to perform the steps of the methods corresponding to FIG. 3 to FIG. 10A and FIG. 10B.

Figure 11:
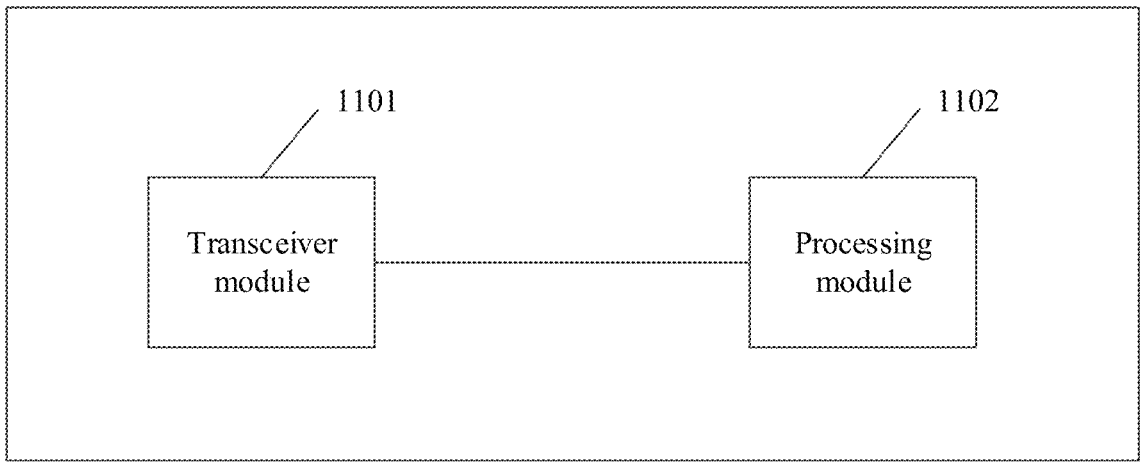
FIG. 11 is a schematic diagram of a structure of a machine learning model update device according to an embodiment of this disclosure.

FIG. 11 is a schematic diagram of a structure of a machine learning model update device according to an embodiment of this disclosure.

The device includes a transceiver module 1101 and a processing module 1102.

When the device is the participant A1 described in the embodiments corresponding to FIG. 3 to FIG. 10A and FIG. 10B, the transceiver module 1101 is configured to perform step 301 in the embodiment corresponding to FIG. 3 and other steps related to receiving and sending in the embodiment corresponding to FIG. 3; and the processing module 1102 is configured to perform step 301 and step 303 in the embodiment corresponding to FIG. 3 and other steps related to data processing in the embodiment corresponding to FIG. 3.

In a possible implementation, the transceiver module 1101 is configured to perform step 402 and step 405 in the embodiment corresponding to FIG. 4 and other steps related to receiving and sending in the embodiment corresponding to FIG. 4; and the processing module 1102 is configured to perform steps 401, 402, 405, 406, and 407 in the embodiment corresponding to FIG. 4 and other steps related to data processing in the embodiment corresponding to FIG. 4.

In a possible implementation, the transceiver module 1101 is configured to perform step 502 and step 503 in the embodiment corresponding to FIG. 5 and other steps related to receiving and sending in the embodiment corresponding to FIG. 5; and the processing module 1102 is configured to perform steps 501, 502, 503, 506, 507, and 508 in the embodiment corresponding to FIG. 5 and other steps related to data processing in the embodiment corresponding to FIG. 5.

In a possible implementation, the transceiver module 1101 is configured to perform steps 602, 602", 603, 604, and 607 in the embodiment corresponding to FIG. 6A and FIG. 6B and other steps related to receiving and sending in the embodiment corresponding to FIG. 6A and FIG. 6B; and the processing module 1102 is configured to perform steps 601, 603, 604, 607, 608, and 609 in the embodiment corresponding to FIG. 6A and FIG. 6B and other steps related to data processing in the embodiment corresponding to FIG. 6A and FIG. 6B.

Figure 8A:
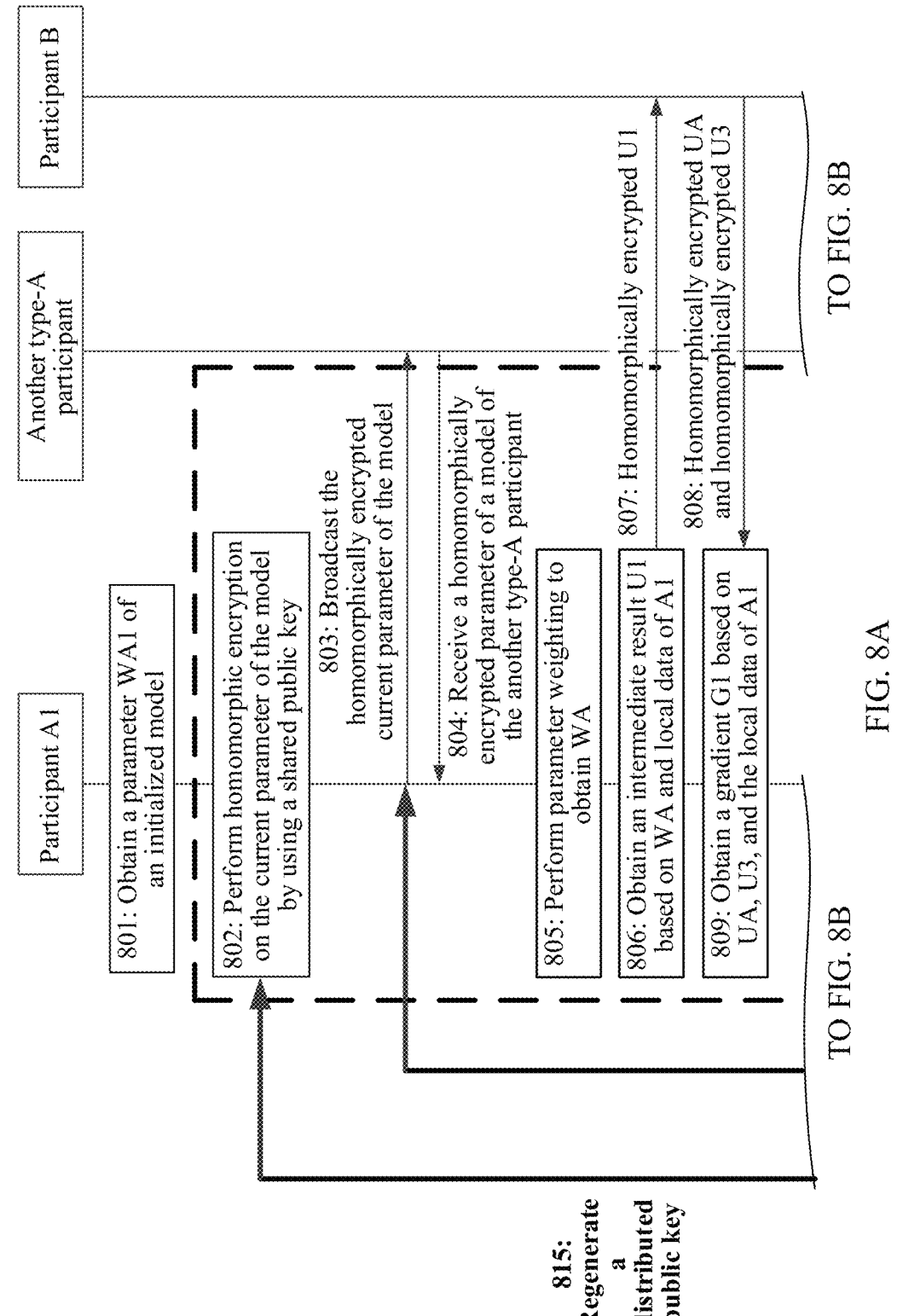
FIG. 8A and FIG. 8B are a schematic flowchart of another offline processing method according to an embodiment of this disclosure.
Figure 8B:
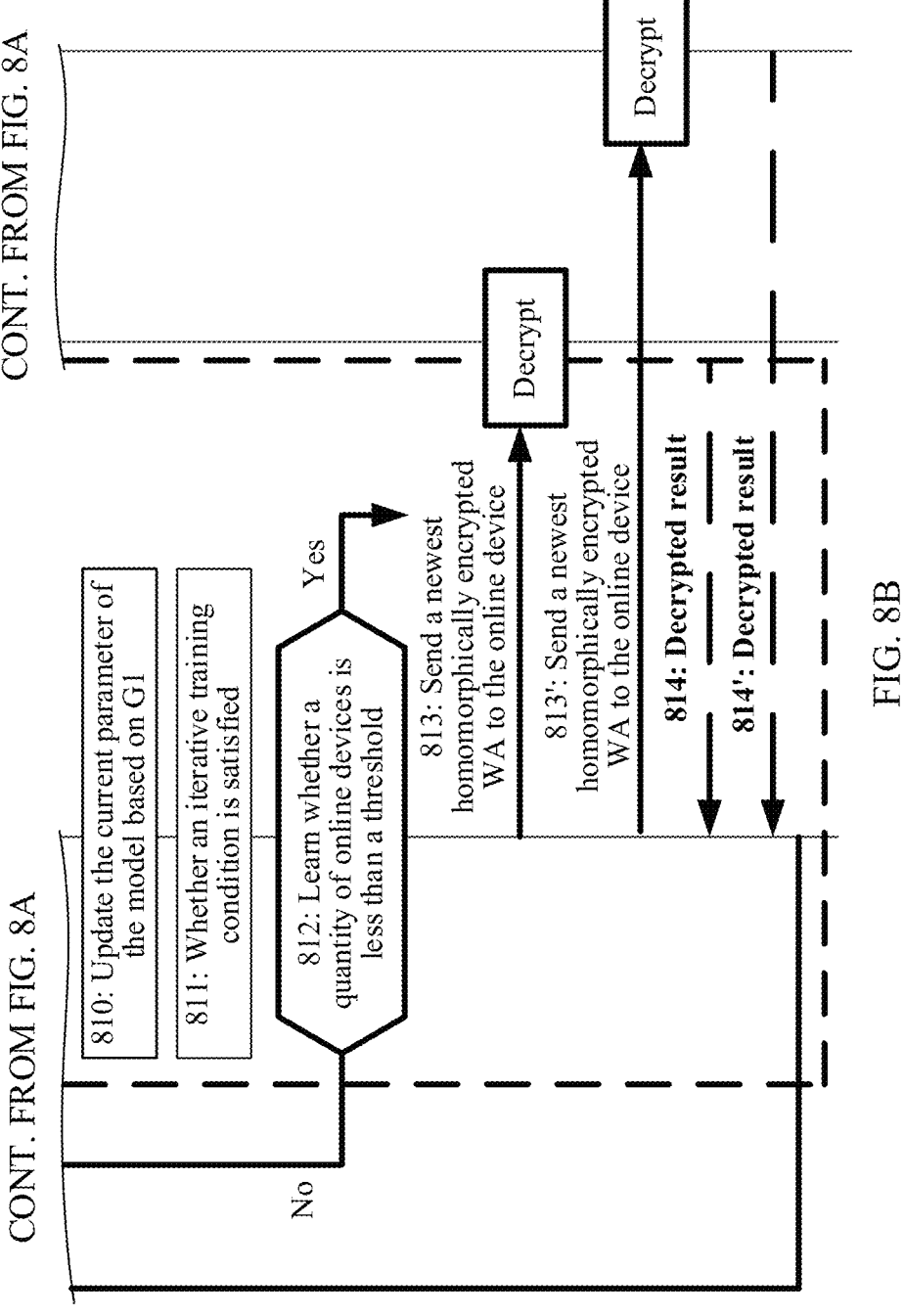

In a possible implementation, the transceiver module 1101 is configured to perform steps 802, 803, 804, 807, 808, 813, 813', 814, and 814' in the embodiment corresponding to FIG. 8A and FIG. 8B and other steps related to receiving and sending in the embodiment corresponding to FIG. 8A and FIG. 8B.

The processing module 1102 is configured to perform steps 801, 802, 805, 806, 809, 810, 811, 812, and 815 in the embodiment corresponding to FIG. 8A and FIG. 8B and other steps related to data processing in the embodiment corresponding to FIG. 8A and FIG. 8B.

When the device is the participant A2 described in the embodiments corresponding to FIG. 3 to FIG. 10A and FIG. 10B, the transceiver module 1101 is configured to perform step 301' in the embodiment corresponding to FIG. 3 and other steps related to receiving and sending in the embodiment corresponding to FIG. 3; and the processing module 1102 is configured to perform step 301' and step 303' in the embodiment corresponding to FIG. 3 and other steps related to data processing in the embodiment corresponding to FIG. 3.

In a possible implementation, the transceiver module 1101 is configured to perform step 402' and step 405' in the embodiment corresponding to FIG. 4 and other steps related to receiving and sending in the embodiment corresponding to FIG. 4; and the processing module 1102 is configured to perform steps 401', 402', 405', 406', and 407' in the embodiment corresponding to FIG. 4 and other steps related to data processing in the embodiment corresponding to FIG. 4.

In a possible implementation, the transceiver module 1101 is configured to perform step 502' and step 503' in the embodiment corresponding to FIG. 5 and other steps related to receiving and sending in the embodiment corresponding to FIG. 5; and the processing module 1102 is configured to perform steps 501', 502', 503', 506', 507', and 508' in the embodiment corresponding to FIG. 5 and other steps related to data processing in the embodiment corresponding to FIG. 5.

In a possible implementation, the transceiver module 1101 is configured to perform steps 602, 602', 603', 604', and 607' in the embodiment corresponding to FIG. 6A and FIG. 6B and other steps related to receiving and sending in the embodiment corresponding to FIG. 6A and FIG. 6B; and the processing module 1102 is configured to perform steps 601', 603', 604', 607', 608', and 609' in the embodiment corresponding to FIG. 6A and FIG. 6B and other steps related to data processing in the embodiment corresponding to FIG. 6A and FIG. 6B.

When the device is the participant B described in the embodiments corresponding to FIG. 3 to FIG. 10A and FIG. 10B, the transceiver module 1101 is configured to perform step 302 in the embodiment corresponding to FIG. 3 and other steps related to receiving and sending in the embodiment corresponding to FIG. 3; and the processing module 1102 is configured to perform step 302 and step 303" in the embodiment corresponding to FIG. 3 and other steps related to data processing in the embodiment corresponding to FIG. 3.

In a possible implementation, the transceiver module 1101 is configured to perform step 403" in the embodiment corresponding to FIG. 4 and other steps related to receiving and sending in the embodiment corresponding to FIG. 4; and the processing module 1102 is configured to perform 401", 402", 403", 405", 406", and 407" in the embodiment corresponding to FIG. 4 and other steps related to data processing in the embodiment corresponding to FIG. 4.

In a possible implementation, the transceiver module 1101 is configured to perform steps 504, 505, and 505" in the embodiment corresponding to FIG. 5; and the processing module 1102 is configured to perform steps 501", 506", 507", and 508" in the embodiment corresponding to FIG. 5 and other steps related to data processing in the embodiment corresponding to FIG. 5.

In a possible implementation, the transceiver module 1101 is configured to perform steps 602, 602", 608, 606", and 606' in the embodiment corresponding to FIG. 6A and FIG. 6B and other steps related to receiving and sending in the embodiment corresponding to FIG. 6A and FIG. 6B; and the processing module 1102 is configured to perform steps 601", 605, 604", 607", 608", and 609" in the embodiment corresponding to FIG. 6A and FIG. 6B and other steps related to data processing in the embodiment corresponding to FIG. 6A and FIG. 6B.

When the device is the device participating in the federated training described in the embodiments corresponding to FIG. 3 to FIG. 10A and FIG. 10B, the transceiver module 1101 is configured to perform step 701 and step 702 in the embodiment corresponding to FIG. 7 and other steps related to receiving and sending in the embodiment corresponding to FIG. 7; and the processing module 1102 is configured to perform steps 701, 702, and 703 in the embodiment corresponding to FIG. 7 and other steps related to data processing in the embodiment corresponding to FIG. 7.

In a possible implementation, the transceiver module 1101 is configured to perform step 901 in the embodiment corresponding to FIG. 9 and other steps related to receiving and sending in the embodiment corresponding to FIG. 9; and the processing module 1102 is configured to perform steps 901, 902, and 903 in the embodiment corresponding to FIG. 9 and other steps related to data processing in the embodiment corresponding to FIG. 9.

In a possible implementation, the processing module is configured to generate a first intermediate result, where the first intermediate result is obtained based on a parameter of a first machine learning model and historical user data that is obtained by a first data processing device.

The transceiver module is configured to receive a second intermediate result, where the second intermediate result is obtained based on a parameter of a second machine learning model and historical user data that is obtained by a second data processing device.

The processing module is further configured to update the parameter of the first machine learning model based on the first intermediate result and the second intermediate result.

The transceiver module is further configured to send a third intermediate result to the second data processing device, where the third intermediate result is obtained from the first intermediate result based on the parameter of the first machine learning model and target historical user data in the historical user data obtained by the first data processing device, an identifier of the target historical user data is the same as an identifier of the historical user data of the second data processing device, and the third intermediate result and the second intermediate result are used to update the parameter of the second machine learning model.

In a possible implementation, the processing module is further configured to:

generate a distributed public key based on an obtained first public key and an obtained second public key, where the first public key is generated by the first data processing device, and the second public key is generated by the second data processing device; and perform homomorphic encryption on the third intermediate result by using the distributed public key, where a first private key or a second private key whose quantity is greater than a target quantity is used to decrypt the homomorphically encrypted third intermediate result, the first private key is generated by the first data processing device, and the second private key is generated by the second data processing device.

In a possible implementation, the transceiver module is further configured to:

when learning that a quantity of online data processing devices in a system is less than a threshold, send the homomorphically encrypted parameter of the first machine learning model to the online data processing device, so that the online data processing device decrypts the homomorphically encrypted parameter of the first machine learning model by using the first private key or the second private key of the online data processing device, where the threshold is greater than the target quantity.

In a possible implementation, the transceiver module is further configured to:

receive the parameter that is of the first machine learning model and that is obtained after the online data processing device performs decryption by using the first private key or the second private key of the online data processing device.

In a possible implementation, the first intermediate result is specifically obtained based on the parameter of the first machine learning model, the historical user data of the first data processing device, and a target vector, and the processing module is further configured to:

obtain the target vector based on a homomorphically encrypted first vector and a second vector, where the first vector has N dimensions, the N dimensions are corresponding to identifiers of all historical user data in the system, a value of a first dimension of the first vector indicates whether an identifier of first historical user data exists in the identifier of the historical user data obtained by the second data processing device, the first dimension is corresponding to the identifier of the first historical user data, the second vector and the first vector have same dimensions, and a value of a first dimension of the second vector indicates whether the identifier of the first historical user data exists in an identifier of the historical user data of the first data processing device.

In a possible implementation, the historical user data obtained by the first data processing device and the historical user data obtained by the second data processing device have different feature space.

In a possible implementation, the transceiver module is configured to receive a third intermediate result, where a first intermediate result is obtained based on a parameter of a first machine learning model and historical user data that is obtained by a first data processing device, the third intermediate result is obtained from the first intermediate result based on the parameter of the first machine learning model and target historical user data in the historical user data obtained by the first data processing device, and an identifier of the target historical user data is the same as an identifier of historical user data of a second data processing device.

The processing module is configured to:

obtain a second intermediate result, where the second intermediate result is obtained based on a parameter of a second machine learning model and the historical user data that is obtained by the second data processing device, and the second intermediate result and the first intermediate result are used to update the parameter of the first machine learning model; and update the parameter of the second machine learning model based on the third intermediate result and the second intermediate result.

In a possible implementation, the transceiver module is further configured to obtain parameters of a plurality of initialized machine learning models, where one initialized machine learning model is deployed in one third data processing device, historical user data obtained by any two third data processing devices has same feature space and different data identifiers, and the second data processing device is any one of the plurality of third data processing devices.

The processing module is further configured to:

perform weighted processing on the obtained parameters of the plurality of initialized machine learning models, to obtain a weighted value; and update, based on the weighted value, a parameter of an initialized machine learning model deployed in the second data processing device, to obtain the parameter of the second machine learning model.

In a possible implementation, the processing module is further configured to:

generate a distributed public key based on an obtained first public key and an obtained second public key, where the first public key is generated by the first data processing device, and the second public key is generated by the second data processing device; and perform homomorphic encryption on the second intermediate result by using the distributed public key, where a first private key or a second private key whose quantity is greater than a target quantity is used to decrypt the homomorphically encrypted second intermediate result, the first private key is generated by the first data processing device, and the second private key is generated by the second data processing device.

In a possible implementation, the transceiver module is further configured to:

when learning that a quantity of online data processing devices in a system is less than a threshold, send the homomorphically encrypted parameter of the second machine learning model to the online data processing device, so that the online data processing device decrypts the homomorphically encrypted parameter of the second machine learning model by using a first private key or a second private key of the online data processing device, where the threshold is greater than the target quantity.

In a possible implementation, the transceiver module is further configured to:

receive the parameter that is of the second machine learning model and that is obtained after the online data processing device performs decryption by using the first private key or the second private key of the online data processing device.

In a possible implementation, the second intermediate result is specifically obtained based on the parameter of the second machine learning model, the historical user data of the second data processing device, and a target vector, and the processing module is further configured to:

obtain a first vector, where the first vector has N dimensions, the N dimensions are corresponding to identifiers of all historical user data in the system, a value of a first dimension of the first vector indicates whether an identifier of first historical user data exists in the identifier of the historical user data obtained by the second data processing device, and the first dimension is corresponding to the identifier of the first historical user data; and obtain the target vector based on a homomorphically encrypted second vector and the first vector, where the second vector and the first vector have same dimensions, and a value of a first dimension of the second vector indicates whether the identifier of the first historical user data exists in an identifier of the historical user data of the first data processing device.

Figure 12:
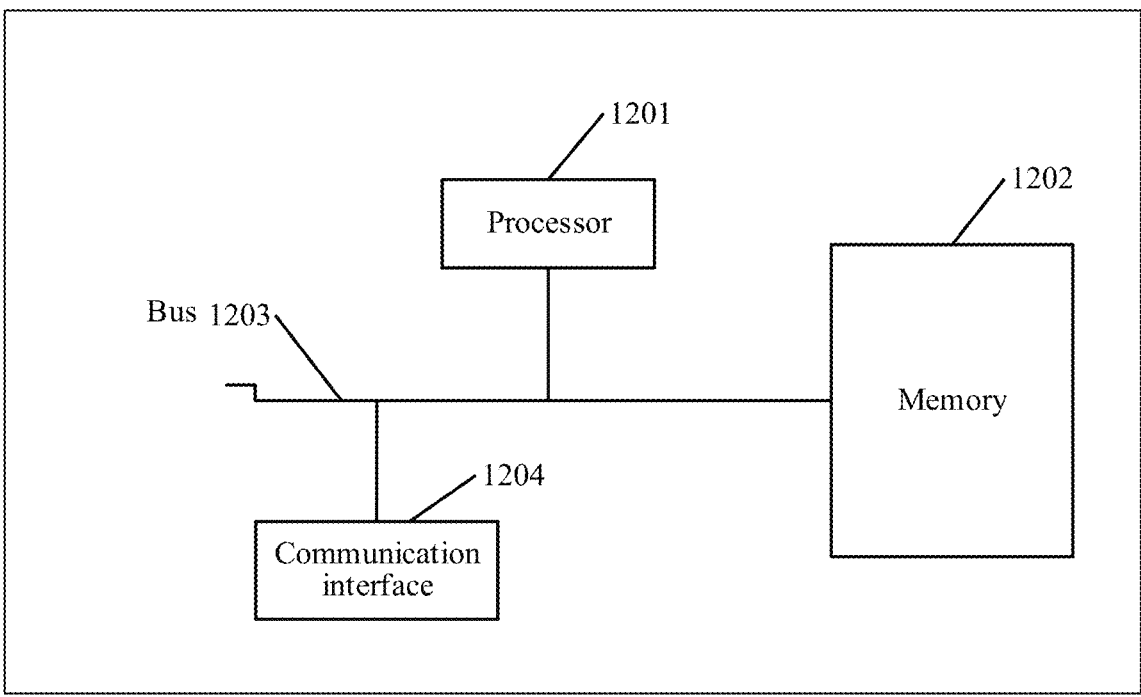
FIG. 12 is a schematic diagram of a structure of another machine learning model update device according to an embodiment of this disclosure.

FIG. 12 is a schematic diagram of a structure of another machine learning model update device according to an embodiment of this disclosure. The device is equivalent to any participant or device described in FIG. 3 to FIG. 10A and FIG. 10B.

The apparatus shown in FIG. 12 may include a processor 1201, a memory 1202, a communication interface 1204, and a bus 1203. The processor 1201, the memory 1202, and the communication interface 1204 may be connected to each other through the bus 1203.

The processor 1201 is a control center of a computer device, and may be a general-purpose central processing unit (CPU), another general-purpose processor, or the like. The general-purpose processor may be a microprocessor, any conventional processor, or the like.

In an example, the processor 1201 may include one or more CPUs.

The memory 1202 may be a read-only memory (ROM), another type of static storage device that can store static information and instructions, a random access memory (RAM), or another type of dynamic storage device that can store information and instructions, or may be an electrically erasable programmable read-only memory (EEPROM), a magnetic disk storage medium, another magnetic storage device, or any other medium that can be used to carry or store expected program code in a form of instructions or a data structure and that can be accessed by a computer. However, no limitation is imposed thereto.

In a possible implementation, the memory 1202 may be independent of the processor 1201. The memory 1202 may be connected to the processor 1201 through the bus 1203, and is configured to store data, instructions, or program code. When invoking and executing the instructions or the program code stored in the memory 1202, the processor 1201 can implement the machine learning model update methods provided in embodiments of this disclosure, for example, the machine learning model update method shown in any one of FIG. 3 to FIG. 10A and FIG. 10B.

In another possible implementation, the memory 1202 may be alternatively integrated with the processor 1201.

The communication interface 1204 is configured to connect an apparatus to another device through a communication network, where the communication network may be an Ethernet, a radio access network (RAN), a wireless local area network (WLAN), or the like. The communication interface 1204 may include a receiving unit configured to receive data and a sending unit configured to send data.

The bus 1203 may be an industry standard architecture (ISA) bus, a peripheral component interconnect (PCI) bus, an extended industry standard architecture (EISA) bus, or the like. The bus may be classified into an address bus, a data bus, a control bus, and the like. For case of representation, the bus is represented by using only one bold line in FIG. 12, which, however, does not mean that there is only one bus or one type of bus.

It should be noted that, in addition to the components shown in FIG. 12, the machine learning model update device may include more or fewer components than those shown in the figure, or a combination of some components, or a different arrangement of the components.

In the specification, claims, and accompanying drawings of this disclosure, terms such as "first" and "second" are intended to distinguish between similar objects but do not necessarily indicate a specific order or sequence. It should be understood that the data termed in such a way are interchangeable in appropriate circumstances so that embodiments described herein can be implemented in other orders than the order illustrated or described herein. A term "and/or" in this disclosure describes only an association relationship for describing associated objects and represents that three relationships may exist. For example, A and/or B may represent the following three cases: Only A exists, both A and B exist, and only B exists. In addition, a character "/" in this specification generally indicates an "or" relationship between associated objects. Moreover, terms "include", "contain" and any other variants thereof are intended to cover non-exclusive inclusions, for example, a process, method, system, product, or device that includes a series of steps or modules is not necessarily limited to those steps or modules expressly listed, but may include other steps or modules not expressly listed or inherent to such a process, method, product, or device. Names or numbers of steps in this disclosure do not mean that the steps in the method procedures need to be performed in chronological/logical order indicated by the names or numbers. An execution sequence of the steps in the procedures that have been named or numbered may be changed based on a technical objective to be implemented, provided that a same or similar technical effect can be achieved. Division into the modules in this disclosure is logical function division and may be other division in actual application. For example, a plurality of modules may be combined or integrated into another system, or some features may be ignored or not be performed. In addition, the displayed or discussed mutual couplings or direct couplings or communication connections may be implemented through some ports. The indirect couplings or communication connections between modules may be implemented in an electrical or another similar form. This is not limited in this disclosure. Moreover, modules or submodules described as separate components may be or may not be physically separated, may be or may not be physical modules, or may be distributed in different circuit modules. Some or all of the modules may be selected depending on an actual requirement, to implement the objectives of the solutions of this disclosure.

What is claimed is:

1. A user data processing system, wherein the system comprises a first data processing device and a second data processing device;

the first data processing device is configured to:

generate a first intermediate result, wherein the first intermediate result is obtained based on a parameter of a first machine learning model and historical user data that is obtained by the first data processing device;

receive a second intermediate result, wherein the second intermediate result is obtained based on a parameter of a second machine learning model and historical user data that is obtained by the second data processing device;

update the parameter of the first machine learning model based on the first intermediate result and the second intermediate result; and send a third intermediate result to the second data processing device, wherein the third intermediate result is obtained from the first intermediate result based on the parameter of the first machine learning model and target historical user data in the historical user data obtained by the first data processing device, and an identifier of the target historical user data is the same as an identifier of the historical user data obtained by the second data processing device; and the second data processing device is configured to:

update the parameter of the second machine learning model based on the third intermediate result and the second intermediate result.

2. The system according to claim 1, wherein the system comprises a plurality of third data processing devices, historical user data obtained by any two third data processing devices has same feature space and different data identifiers, the second data processing device is any one of the plurality of third data processing devices, an initialized machine learning model is deployed in each third data processing device, and the second data processing device is further configured to:

obtain parameters of a plurality of initialized machine learning models;

perform weighted processing on the obtained parameters of the plurality of initialized machine learning models, to obtain a weighted value; and update, based on the weighted value, a parameter of an initialized machine learning model deployed in the second data processing device, to obtain the parameter of the second machine learning model.

3. The system according to claim 1, wherein the first data processing device is further configured to:

generate a first public key and a first private key; and the second data processing device is further configured to:

generate a second public key and a second private key, wherein the first public key and the second public key are used to generate a distributed public key, the distributed public key is used to perform homomorphic encryption on the first intermediate result or the second intermediate result, and a quantity of first private keys or a quantity of second private keys whose quantity is greater than a target quantity is used to decrypt the homomorphically encrypted first intermediate result or the homomorphically encrypted second intermediate result.

4. The system according to claim 3, wherein the second data processing device is further configured to:

when learning that a quantity of online data processing devices in the system is less than a threshold, send the homomorphically encrypted parameter of the second machine learning model to an online data processing device, so that the online data processing device decrypts the homomorphically encrypted parameter of the second machine learning model by using a first private key or a second private key of the online data processing device, wherein the threshold is not less than the target quantity.

5. The system according to claim 4, wherein the second data processing device is further configured to:

receive the parameter that is of the second machine learning model and that is obtained after the online data processing device performs decryption by using the first private key or the second private key of the online data processing device.

6. The system according to claim 3, wherein the first data processing device is further configured to:

when learning that a quantity of online data processing devices in the system is less than a threshold, send the homomorphically encrypted parameter of the first machine learning model to an online data processing device, so that the online data processing device decrypts a homomorphically encrypted parameter of the first machine learning model by using the quantity of first private keys or the quantity of second private keys of the online data processing device, wherein the threshold is greater than the target quantity.

7. The system according to claim 6, wherein the first data processing device is further configured to:

receive the parameter that is of the first machine learning model and that is obtained after the online data processing device performs decryption by using the first private key or the second private key of the online data processing device.

8. The system according to claim 1, wherein the second intermediate result is specifically obtained based on the parameter of the second machine learning model, the historical user data obtained by the second data processing device, and a target vector, and the second data processing device is further configured to:

obtain a first vector, wherein the first vector has N dimensions, the N dimensions are corresponding to identifiers of all historical user data in the system, a value of a first dimension of the first vector indicates whether an identifier of first historical user data exists in the identifier of the historical user data obtained by the second data processing device, and the first dimension is corresponding to the identifier of the first historical user data; and obtain the target vector based on a homomorphically encrypted second vector and the first vector, wherein the second vector and the first vector have same dimensions, and a value of a first dimension of the second vector indicates whether the identifier of the first historical user data exists in an identifier of the historical user data obtained by the first data processing device.

9. The system according to claim 8, wherein the first intermediate result is specifically obtained based on the parameter of the first machine learning model, the historical user data obtained by the first data processing device, and the target vector, and the first data processing device is further configured to:

obtain the target vector based on the homomorphically encrypted first vector and the second vector.

10. The system according to claim 1, wherein the historical user data obtained by the first data processing device and the historical user data obtained by the second data processing device have different feature space and a same data identifier.

11. A user data processing method, comprising:

generating, by a first data processing device, a first intermediate result, wherein the first intermediate result is obtained based on a parameter of a first machine learning model and historical user data that is obtained by the first data processing device;

receiving, by the first data processing device, a second intermediate result, wherein the second intermediate result is obtained based on a parameter of a second machine learning model and historical user data that is obtained by a second data processing device;

updating, by the first data processing device, the parameter of the first machine learning model based on the first intermediate result and the second intermediate result; and sending, by the first data processing device, a third intermediate result to the second data processing device, wherein the third intermediate result is obtained from the first intermediate result based on the parameter of the first machine learning model and target historical user data in the historical user data obtained by the first data processing device, an identifier of the target historical user data is the same as an identifier of the historical user data of the second data processing device, and the third intermediate result and the second intermediate result are used to update the parameter of the second machine learning model.

12. The method according to claim 11, wherein the method further comprises:

generating, by the first data processing device, a distributed public key based on an obtained first public key and an obtained second public key, wherein the first public key is generated by the first data processing device, and the second public key is generated by the second data processing device; and performing, by the first data processing device, homomorphic encryption on the third intermediate result by using the distributed public key, wherein a first private key or a second private key whose quantity is greater than a target quantity is used to decrypt the homomorphically encrypted third intermediate result, the first private key is generated by the first data processing device, and the second private key is generated by the second data processing device.

13. The method according to claim 12, wherein the method further comprises:

when learning that a quantity of online data processing devices in a system is less than a threshold, sending, by the first data processing device, a homomorphically encrypted parameter of the first machine learning model to an online data processing device, so that the online data processing device decrypts the homomorphically encrypted parameter of the first machine learning model by using the first private key or the second private key of the online data processing device, wherein the threshold is greater than the target quantity.

14. The method according to claim 11, wherein the first intermediate result is specifically obtained based on the parameter of the first machine learning model, the historical user data of the first data processing device, and a target vector, and the method further comprises:

obtaining, by the first data processing device, the target vector based on a homomorphically encrypted first vector and a second vector, wherein the first vector has N dimensions, the N dimensions are corresponding to identifiers of all historical user data in a system, a value of a first dimension of the first vector indicates whether an identifier of first historical user data exists in the identifier of the historical user data obtained by the second data processing device, the first dimension is corresponding to the identifier of the first historical user data, the second vector and the first vector have same dimensions, and a value of a first dimension of the second vector indicates whether the identifier of the first historical user data exists in an identifier of the historical user data of the first data processing device.

15. The method according to claim 13, wherein the historical user data obtained by the first data processing device and the historical user data obtained by the second data processing device have different feature space.

16. A user data processing apparatus, comprising:

a processor; and a non-transitory computer-readable storage medium configured to store a program, comprising instructions that, when to be executed by the processor, the program including instructions for cause the user data processing apparatus to perform the operations:

generate a first intermediate result, wherein the first intermediate result is obtained based on a parameter of a first machine learning model and historical user data that is obtained by a first data processing device;

receive a second intermediate result, wherein the second intermediate result is obtained based on a parameter of a second machine learning model and historical user data that is obtained by a second data processing device;

update the parameter of the first machine learning model based on the first intermediate result and the second intermediate result; and send a third intermediate result to the second data processing device, wherein the third intermediate result is obtained from the first intermediate result based on the parameter of the first machine learning model and target historical user data in the historical user data obtained by the first data processing device, an identifier of the target historical user data is the same as an identifier of the historical user data of the second data processing device, and the third intermediate result and the second intermediate result are used to update the parameter of the second machine learning model.

17. The apparatus according to claim 16, wherein the program further comprises instructions that, when executed by the processor, cause a session management network element to perform:

generate a distributed public key based on an obtained first public key and an obtained second public key, wherein the first public key is generated by the first data processing device, and the second public key is generated by the second data processing device; and perform homomorphic encryption on the third intermediate result by using the distributed public key, wherein a first private key or a second private key whose quantity is greater than a target quantity is used to decrypt the homomorphically encrypted third intermediate result, the first private key is generated by the first data processing device, and the second private key is generated by the second data processing device.

18. The apparatus according to claim 17, wherein the program further comprises instructions that, when executed by the processor, cause the session management network element to perform:

when learning that a quantity of online data processing devices in a system is less than a threshold, send the homomorphically encrypted parameter of the first machine learning model to the online data processing device, so that an online data processing device decrypts a homomorphically encrypted parameter of the first machine learning model by using the first private key or the second private key of the online data processing device, wherein the threshold is greater than the target quantity.

19. The apparatus according to claim 16, wherein the first intermediate result is specifically obtained based on the parameter of the first machine learning model, the historical user data of the first data processing device, and a target vector, and the program further comprises instructions that, when executed by the processor, cause a session management network element to perform:

obtain the target vector based on a homomorphically encrypted first vector and a second vector, wherein the first vector has N dimensions, the N dimensions are corresponding to identifiers of all historical user data in a system, a value of a first dimension of the first vector indicates whether an identifier of first historical user data exists in the identifier of the historical user data obtained by the second data processing device, the first dimension is corresponding to the identifier of the first historical user data, the second vector and the first vector have same dimensions, and a value of a first dimension of the second vector indicates whether the identifier of the first historical user data exists in an identifier of the historical user data of the first data processing device.

* * * * *